(12) United States Patent
Yasaki et al.

(10) Patent No.: US 11,647,011 B2
(45) Date of Patent: May 9, 2023

(54) CONTROL METHOD, INFORMATION PROCESSING APPARATUS, AND NON-TRANSITORY COMPUTER-READABLE STORAGE MEDIUM FOR STORING CONTROL PROGRAM

(71) Applicant: FUJITSU LIMITED, Kawasaki (JP)

(72) Inventors: Koichi Yasaki, Kawasaki (JP); Dai Yamamoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 188 days.

(21) Appl. No.: 17/093,338

(22) Filed: Nov. 9, 2020

(65) Prior Publication Data
US 2021/0194867 A1    Jun. 24, 2021

(30) Foreign Application Priority Data

Dec. 24, 2019    (JP) .............................. JP2019-232215

(51) Int. Cl.
*H04L 9/32*    (2006.01)
*H04L 9/40*    (2022.01)
(Continued)

(52) U.S. Cl.
CPC ...... *H04L 63/0823* (2013.01); *H04L 61/4511* (2022.05); *H04L 63/0236* (2013.01); *H04L 63/20* (2013.01); *H04L 67/01* (2022.05)

(58) Field of Classification Search
CPC . H04L 9/3263; H04L 63/168; H04L 63/0823; H04L 63/0807; H04L 63/1483; H04L 63/1425; G06F 16/1734
See application file for complete search history.

(56) References Cited

U.S. PATENT DOCUMENTS 7,177,839 B1   2/2007 Claxton et al.
9,380,053 B1 * 6/2016 Behnken ............. H04L 63/0823
(Continued)

FOREIGN PATENT DOCUMENTS

JP   2005-150888 A   6/2005
JP   2017-098876 A   6/2017
JP   2017-103614 A   6/2017

OTHER PUBLICATIONS

Bertino, Elisa, "Computer Security CS 426 Lecture 7 Public Key Infrastructure (PKI)", Sep. 8, 2009, XP055793886, Retrieved from the Internet:URL:http://citeseerx.ist.psu.edu/viewdoc/download?doi=10.1.1.176.6298&rep=repl&type=pdf [retrieved on Apr. 9, 2021], pp. 1-14, XP055793886.
(Continued)

*Primary Examiner* — Dustin Nguyen
(74) *Attorney, Agent, or Firm* — Fujitsu Patent Center

(57) ABSTRACT

A control method implemented by a computer which is configured to be operated as a terminal apparatus, the control method including: transmitting, from the terminal apparatus to a first management server, a first request for transmission of a certificate of a first server, the first server being one of a plurality of servers, the first management server being configured to manage certificates for the plurality of servers; in response to the transmitting of the first request, receiving the certificate of the first server from the first management server; in response to the receiving of the certificate, determining a certificate authority by using information included in the received certificate, the certificate authority being a server from which the received certificate has been issued; and transmitting, from the terminal apparatus to the determined certificate authority, a second request for transmission of first address information on the first server.

9 Claims, 27 Drawing Sheets

(51) Int. Cl.
  *H04L 61/4511* (2022.01)
  *H04L 67/01* (2022.01)

(56) References Cited

U.S. PATENT DOCUMENTS

| | | |
|---|---|---|
| 2005/0102522 A1 | 5/2005 | Kanda |
| 2010/0111300 A1* | 5/2010 | Kido ................... H04L 63/0823 380/46 |
| 2011/0154024 A1* | 6/2011 | Ignaci ................. H04L 63/0823 713/156 |
| 2011/0213966 A1* | 9/2011 | Fu ....................... H04L 63/0807 726/10 |
| 2011/0213967 A1 | 9/2011 | Wnuk |
| 2014/0373127 A1* | 12/2014 | Thayer ................. H04L 63/168 726/10 |
| 2016/0173488 A1* | 6/2016 | Xie ....................... H04L 9/3263 713/156 |
| 2017/0155642 A1 | 6/2017 | Kobayashi et al. |
| 2017/0279846 A1* | 9/2017 | Osterweil ........... H04L 63/1425 |
| 2020/0313878 A1* | 10/2020 | Wang .................. G06F 16/1734 |
| 2021/0037006 A1* | 2/2021 | Belenko ............. H04L 63/1483 |

OTHER PUBLICATIONS

Schomp, Kyles et al.,"Assessing DNS Vulnerability to Record Injection", Mar. 10, 2014, ICIAP:International Conference on Image Analysis and Processing, 17th International Conference, Naples, Italy, Sep. 9-13, 2013. Proceedings; [Lecture Notes in Computer Science; Lect.Notes Computer], Springer, Berlin, Heidelberg, pp. 214-223, XP047195667.

Hua-Qing, Zhou et al.,"PKI-Based E-Business Security System", 2008 3rd International Conference on Innovative Computing Information and Control, IEEE, Piscataway USA, Jun. 18, 2008, 5 pages, XP031309474.

Extended European Search Report dated Apr. 19, 2021 for corresponding European Patent Application No. 20204942.5, 8 pages.

\* cited by examiner

FIG. 20

| ITEM NUMBER | FQDN | MAIL ADDRESS |
|---|---|---|
| 1 | server01.AAA.co.jp | xxx@AAA.co.jp |
| 2 | server02.BBB.co.jp | yyy@BBB.co.jp |
| 3 | server03.CCC.co.jp | zzz@CCC.co.jp |
| 4 | server04.DDD.co.jp | sss@DDD.co.jp |
| 5 | server05.EEE.co.jp | ttt@EEE.co.jp |
| ... | ... | ... |

FIG. 21

| ITEM NUMBER | FQDN | IP ADDRESS |
|---|---|---|
| 1 | server01.AAA.co.jp | 111.111.111.111 |
| 2 | server02.BBB.co.jp | 222.222.222.222 |
| 3 | server03.CCC.co.jp | 333.333.333.333 |
| 4 | server04.DDD.co.jp | 444.444.444.444 |
| 5 | server05.EEE.co.jp | 555.555.555.555 |
| ... | ... | ... |

CONTROL METHOD, INFORMATION PROCESSING APPARATUS, AND NON-TRANSITORY COMPUTER-READABLE STORAGE MEDIUM FOR STORING CONTROL PROGRAM

CROSS-REFERENCE TO RELATED APPLICATION

This application is based upon and claims the benefit of priority of the prior Japanese Patent Application No. 2019-232215, filed on Dec. 24, 2019, the entire contents of which are incorporated herein by reference.

FIELD

The embodiments discussed herein are related to a control method, an information processing apparatus, and a non-transitory computer-readable storage medium storing a control program.

BACKGROUND

Usually, transmission and reception of date on the Internet are carried out by obtaining the IP address corresponding to the data transmission destination from a domain name system (DNS) server.

For example, a sender server (hereinafter also called a sending server) that is going to transmit data to a server that is the transmission destination (hereinafter also called a transmission destination server) accesses a DNS server that manages the identification information pieces (such as domain names) and the IP addresses of servers with those associated with each other to obtain the IP address of the transmission destination server. The sending server transmits data to the IP address obtained from the DNS server to transmit the data to the transmission destination server.

In recent years, much business data (data on payment information, personal information, and the like) has come to be transmitted and received on the Internet, and also, use of virtual servers whose IP addresses frequently change is becoming widespread. In these circumstances, in recent years, the importance of the DNS server as described above has been becoming higher, and along with this situation, the number of attacks from the outside to the DNS server is increasing.

Examples of the related art include Japanese Laid-open Patent Publication No. 2017-103614

SUMMARY

According to an aspect of the embodiments, described is a control method implemented by a computer which is configured to be operated as a terminal apparatus. In an example, the control method includes: transmitting, from the terminal apparatus to a first management server, a first request for transmission of a certificate of a first server, the first server being one of a plurality of servers, the first management server being configured to manage certificates for the plurality of servers; in response to the transmitting of the first request, receiving the certificate of the first server from the first management server; in response to the receiving of the certificate, determining a certificate authority by using information included in the received certificate, the certificate authority being a server from which the received certificate has been issued; and transmitting, from the terminal apparatus to the determined certificate authority, a second request for transmission of first address information on the first server.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 20 is a diagram for explaining specific examples of first correspondence information 131;

FIG. 21 is a diagram for explaining specific examples of second correspondence information 531;

DESCRIPTION OF EMBODIMENT(S)

The attacks to a DNS server described above include, for example, rewriting of records managed by the DNS server and rewriting of routing tables managed by routers on networks.

Hence, in the case where a DNS server is attacked in such a way, servers that transmit and receive data on the Internet may receive an IP address transmitted from an attacker's DNS server (hereinafter also called a fake DNS server), and this may make it impossible to ensure the security of communication.

In an aspect of the embodiments, described are a control method, an information processing apparatus, and a control program for avoiding obtaining an IP address that is not a desired IP address.

[Configuration of Information Processing System]

Figure 1:
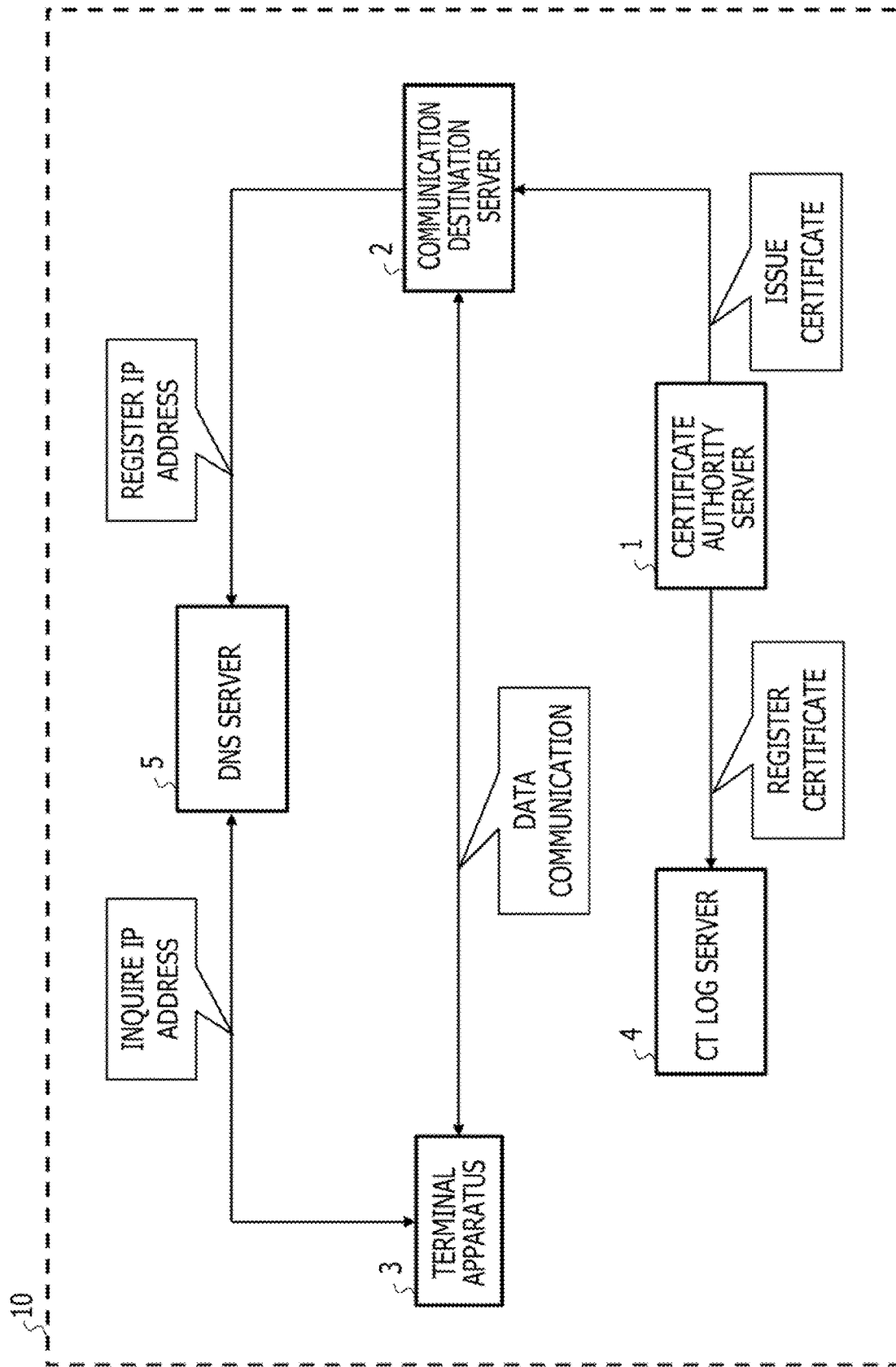
FIG. 1 is a diagram for explaining the configuration of an information processing system 10.

First, the configuration of an information processing system 10 is described. FIG. 1 is a diagram for explaining the configuration of the information processing system 10.

The information processing system 10 illustrated in FIG. 1 includes a certificate authority server 1 which functions as a certificate authority for public keys, a communication destination server 2, a terminal apparatus (hereinafter also called an information processing apparatus) 3, a CT log server (hereinafter also called a first management server) 4, and a DNS server (hereinafter also called a second management server) 5.

Although the following description is based on a case where the information processing system 10 has one each of the certificate authority server 1, the communication destination server 2, the terminal apparatus 3, the CT log server 4, and the DNS server 5, the information processing system 10 may have multiple servers (apparatuses) that have the same function.

In the example illustrated in FIG. 1, the terminal apparatus 3 is a personal computer (PC) with which the operator performs, for example, input of desired information. For example, when the operator inputs information indicating that data will be transmitted to the communication destination server 2, the terminal apparatus 3 accesses the communication destination server 2.

When the terminal apparatus 3 accesses the communication destination server 2, the terminal apparatus 3 has to obtain the IP address of the communication destination server 2.

For this purpose, the communication destination server 2 registers, for example, the IP address of the server itself in the DNS server 5 in advance, as illustrated in FIG. 1. When the terminal apparatus 3 accesses the communication destination server 2, the terminal apparatus 3 inquires the IP address of the communication destination server 2 from the DNS server 5. After that, the terminal apparatus 3 accesses the IP address of the communication destination server 2 transmitted from the DNS server 5.

In the example illustrated in FIG. 1, when the certificate authority server 1 receives a request for issuance of the certificate for a public key (hereinafter simply called the certificate) from the communication destination server 2, the certificate authority server 1 issues the certificate to the communication destination server 2. In this case, the certificate authority server 1 registers the certificate for the communication destination server 2 in the certificate transparency (CT) log server 4. The CT log server 4 is a server that registers the certificates issued by each certificate authority server for the purpose of detecting erroneous issuance of certificates by certificate authority servers (including the certificate authority server 1), attacks to those certificate authority servers, and the like.

In recent years, much business data (data on payment information, personal information, and the like) are communicated on the Internet, and also, the number of cases of using virtual servers whose IP addresses frequently change is increasing. In these circumstances, the importance of the DNS server 5 as described above has been becoming higher than before, and along with this situation, and the number of attacks from the outside to the DNS server 5 is increasing.

The attacks to the DNS server include, for example, rewriting of records managed by the DNS server 5 and rewriting of routing tables managed by routers (not illustrated) disposed on networks.

In these circumstances, when the DNS server 5 is attacked as mentioned above, the terminal apparatus 3 may receive an IP address transmitted from a fake DNS server (not illustrated) (a fake IP address that is not the IP address of the communication destination server 2), and hence, there may be a case where the security of communication is not ensured.

Hence, the DNS server 5, for example, employs the DNS Security Extensions (DNSSEC) technique which adds a signature to the IP address to be transmitted to the terminal apparatus 3. For example, the DNS server 5 generates a signature from an IP address by using the signature key (not illustrated) of the DNS server 5, adds the generated signature to the IP address, and transmits it to the terminal apparatus 3. The terminal apparatus 3 confirms that the IP address received from the DNS server 5 agrees with the IP address restored from the signature by using the public key (not illustrated) of the DNS server 5.

This enables the terminal apparatus 3 to confirm that the IP address transmitted from the DNS server 5 is the desired IP address.

In this case, the DNS server 5 has to strictly manage the signature key in a safe place in the DNS server 5 (hereinafter also called a storage place). In this case, every time a change or the like in the IP address of the communication destination server 2 occurs, the DNS server 5 has to take the signature key out of the storage place to perform processing on it. Hence, in the case of employing the DNSSEC technique as above, the cost for managing the signature key in the DNS server 5 is high.

To address this, the terminal apparatus 3 in the present embodiment transmits a request for transmission of the certificate for the communication destination server 2, to the CT log server 4 which manages certificates for multiple servers. When the terminal apparatus 3 receives the certificate for the communication destination server 2 from the CT log server 4, the terminal apparatus 3 determines the certificate authority server 1 that issued the received certificate based on information included in the received certificate. After that, the terminal apparatus 3 transmits a request for transmission of the IP address of the communication destination server 2 to the determined certificate authority server 1.

In other words, for example, the terminal apparatus 3 in the present embodiment obtains the IP address of the communication destination server 2 without inquiring the IP address from the DNS server 5.

This enables the terminal apparatus 3 to avoid obtaining an IP address that is not the desired IP address.

[Hardware Configuration of Information Processing System]

Next, the hardware configuration of the information processing system 10 is described.

[Hardware Configuration of Terminal Apparatus]

Figure 2:
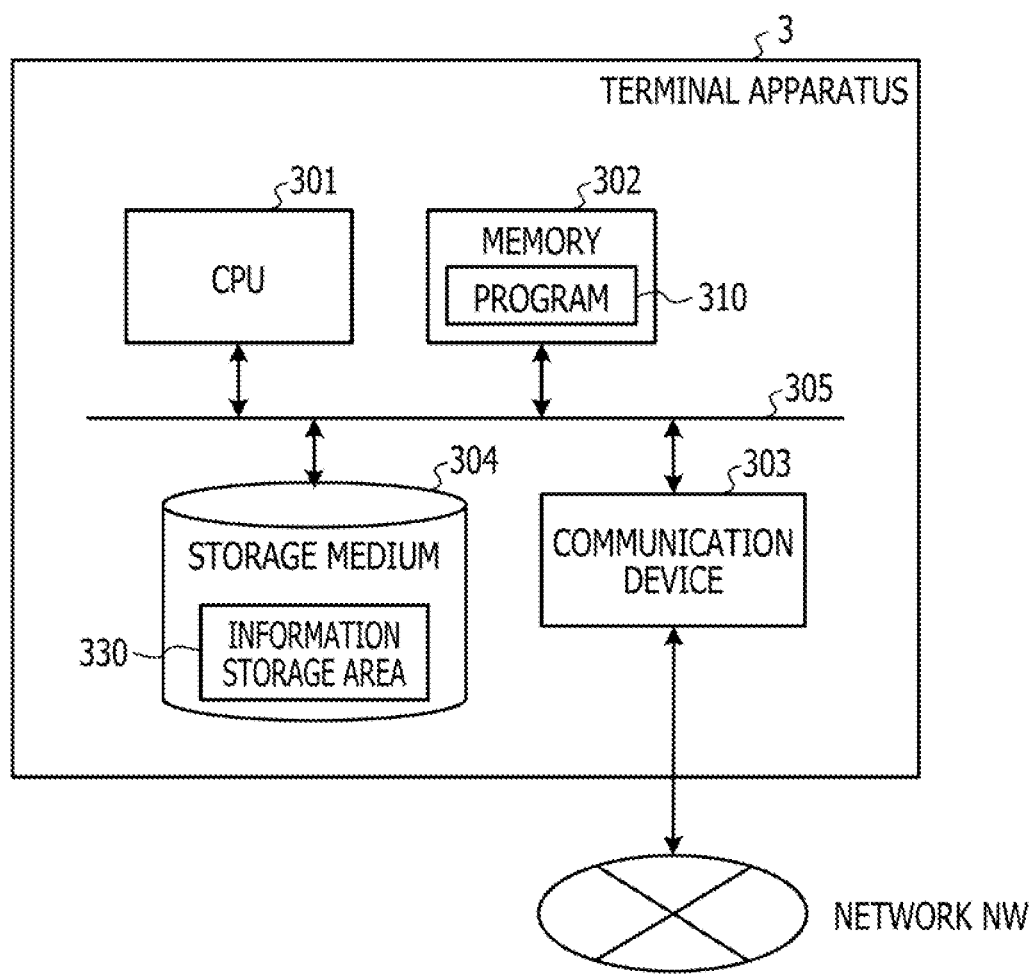
FIG. 2 is a diagram for explaining the hardware configuration of a terminal apparatus 3.

First, the hardware configuration of the terminal apparatus 3 is described. FIG. 2 is a diagram for explaining the hardware configuration of the terminal apparatus 3.

The terminal apparatus 3, as illustrated in FIG. 2, includes a CPU 301 which is a processor, a memory 302, a communication device 303, and a storage medium 304. Those components are coupled to one another via a bus 305.

The storage medium 304 has, for example, a program storage area (not illustrated) for storing a program 310 to perform processing that controls obtaining of the IP address of the communication destination server 2 (hereinafter also called control processing). The storage medium 304 also has, for example, a storage section 330 (hereinafter also called an information storage area 330) that stores information that is used when the control processing is performed. The storage medium 304 may be, for example, a hard disk drive (HDD) or a solid-state drive (SSD).

The CPU 301 executes the program 310 loaded from the storage medium 304 into the memory 302 to perform the control processing.

The communication device 303 performs communication with the communication destination server 2 and others via a network NW.

[Hardware Configuration of CT Log Server]

Figure 3:
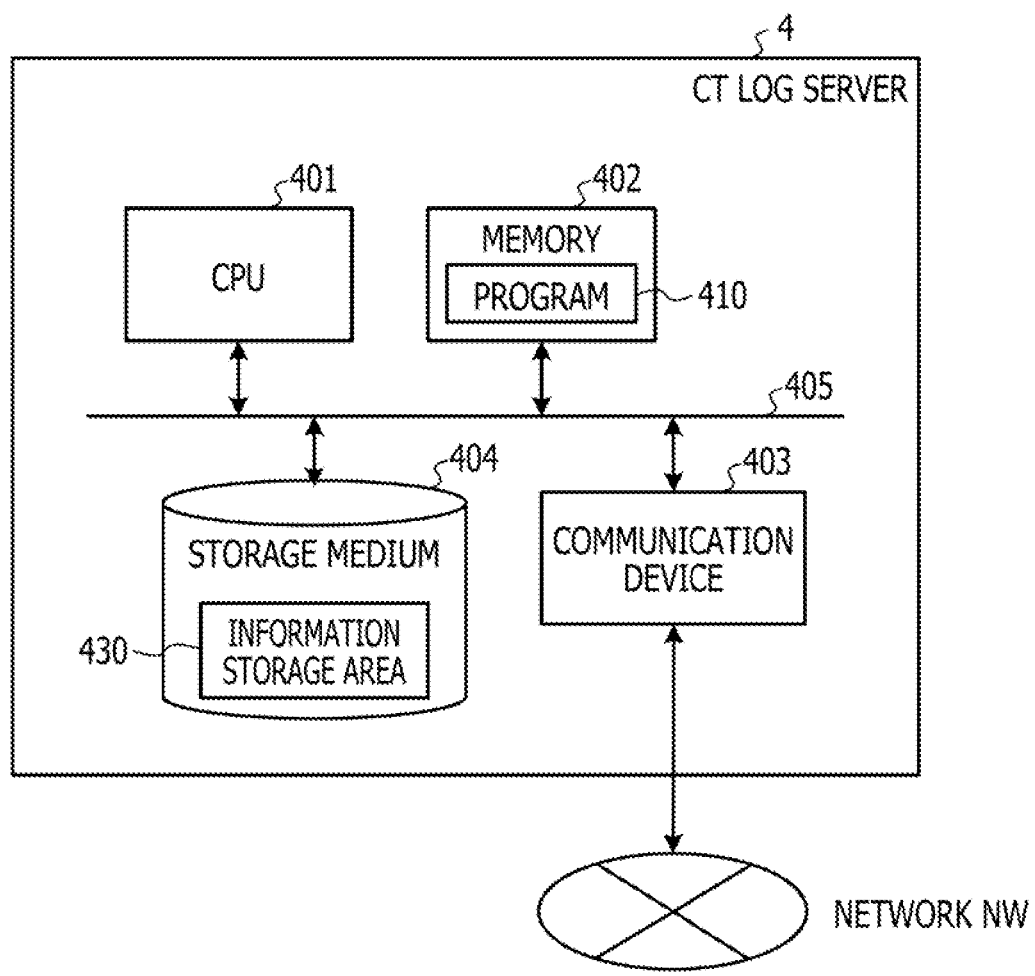
FIG. 3 is a diagram for explaining the hardware configuration of a CT log server 4.

Next, the hardware configuration of the CT log server 4 is described. FIG. 3 is a diagram for explaining the hardware configuration of the CT log server 4.

The CT log server 4, as illustrated in FIG. 3, includes a CPU 401 which is a processor, a memory 402, a communication device 403, and a storage medium 404. Those components are coupled to one another via a bus 405.

The storage medium 404 includes, for example, a program storage area (not illustrated) for storing a program 410 to perform control processing. The storage medium 404 also includes, for example, a storage section 430 (hereinafter also called an information storage area 430) that stores information that is used when the control processing is performed. The storage medium 404 may be, for example, an HDD or an SSD.

The CPU 401 executes the program 410 loaded from the storage medium 404 into the memory 402 to perform the control processing.

The communication device 403 performs communication with the terminal apparatus 3 and others via the network NW.

[Hardware Configuration of Communication Destination Server]

Figure 4:
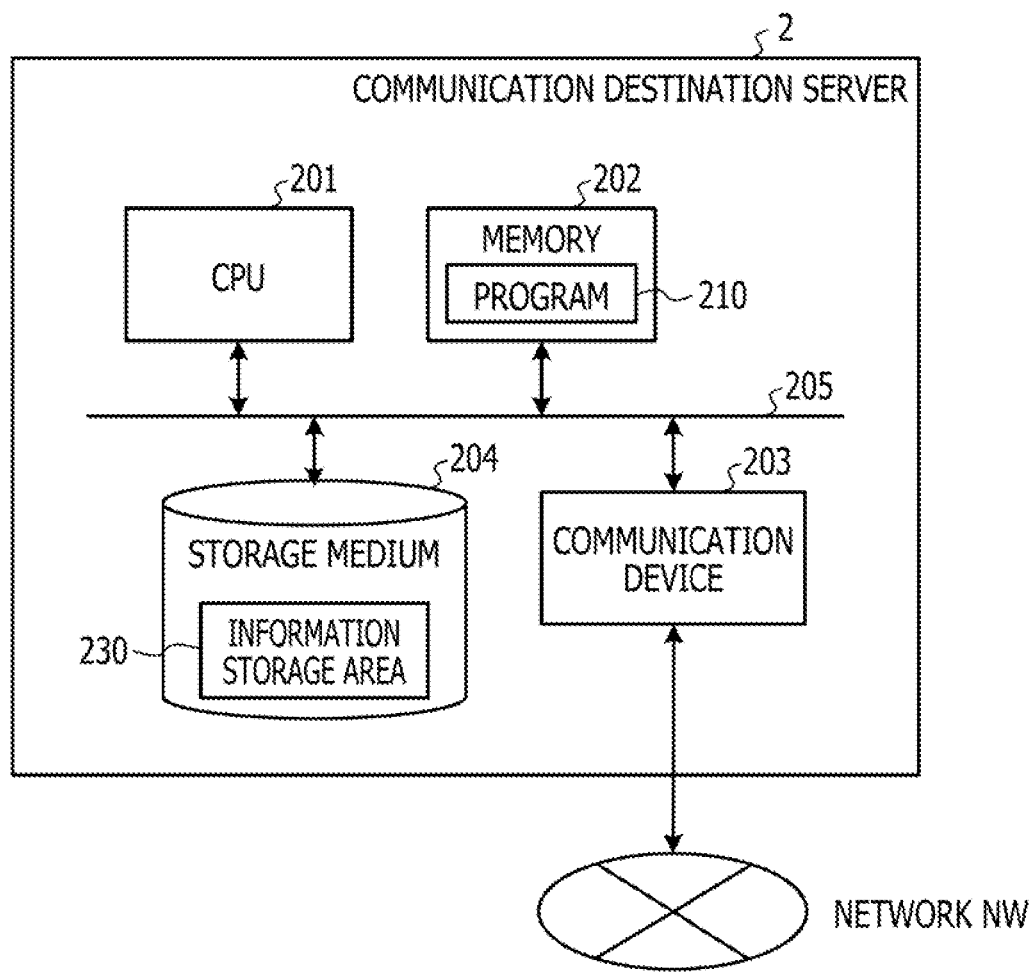
FIG. 4 is a diagram for explaining the hardware configuration of a communication destination server 2.

Next, the hardware configuration of the communication destination server 2 is described. FIG. 4 is a diagram for explaining the hardware configuration of the communication destination server 2.

The communication destination server 2, as illustrated in FIG. 4, includes a CPU 201 which is a processor, a memory 202, a communication device 203, and a storage medium 204. Those components are coupled to one another via a bus 205.

The storage medium 204 includes, for example, a program storage area (not illustrated) for storing a program 210 to perform control processing. The storage medium 204 also includes, for example, a storage section 230 (hereinafter also called an information storage area 230) that stores information that is used when the control processing is performed. The storage medium 204 may be, for example, an HDD or an SSD.

The CPU 201 executes the program 210 loaded from the storage medium 204 into the memory 202 to perform the control processing.

The communication device 203 performs communication with the terminal apparatus 3 and others via the network NW.

[Hardware Configuration of Certificate Authority Server]

Figure 5:
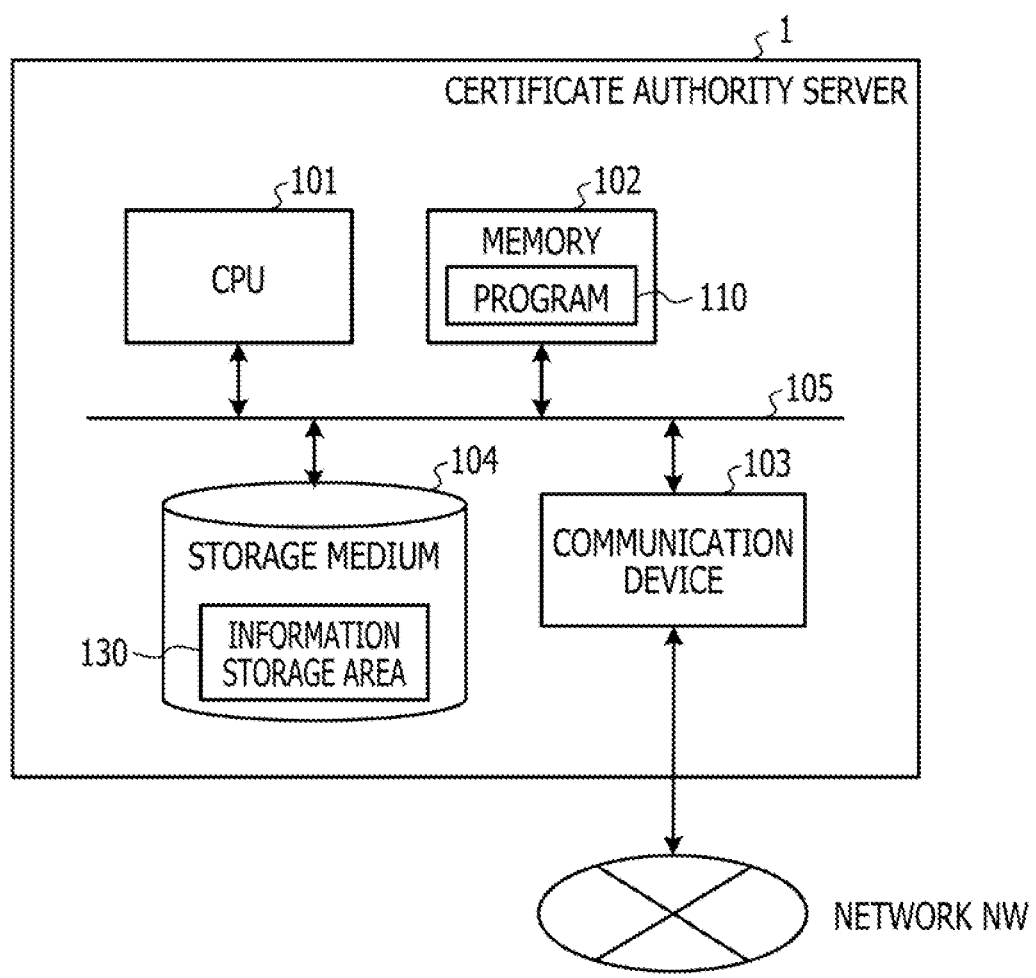
FIG. 5 is a diagram for explaining the hardware configuration of a certificate authority server 1.

Next, the hardware configuration of the certificate authority server 1 is described. FIG. 5 is a diagram for explaining the hardware configuration of the certificate authority server 1.

The certificate authority server 1, as illustrated in FIG. 5, includes a CPU 101 which is a processor, a memory 102, a communication device 103, and a storage medium 104. Those components are coupled to one another via a bus 105.

The storage medium 104 includes, for example, a program storage area (not illustrated) for storing a program 110 to perform control processing. The storage medium 104 also includes, for example, a storage section 130 (hereinafter also called an information storage area 130) that stores information that is used when the control processing is performed. The storage medium 104 may be, for example, an HDD or an SSD.

The CPU 101 executes the program 110 loaded from the storage medium 104 into the memory 102 to perform the control processing.

The communication device 103 performs communication with the terminal apparatus 3 and others via the network NW.

[Hardware Configuration of DNS Server]

Figure 6:
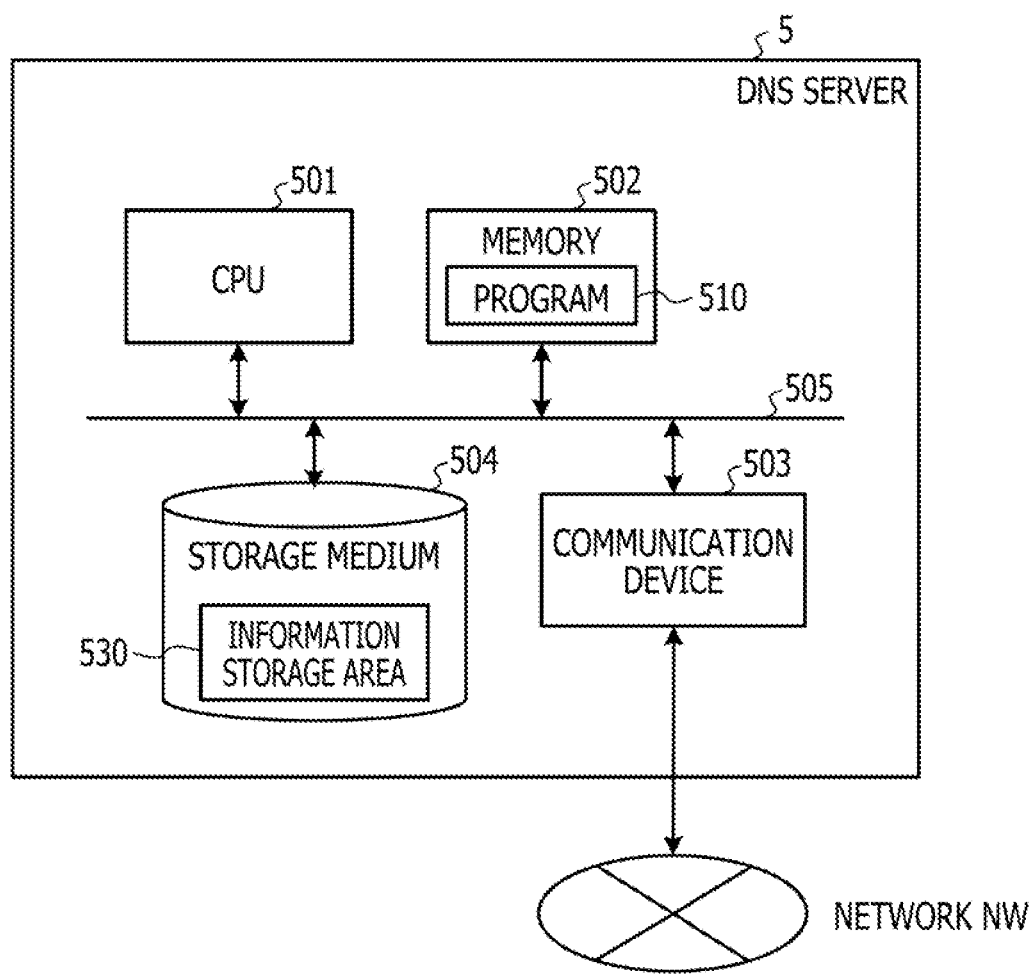
FIG. 6 is a diagram for explaining the hardware configuration of a DNS server 5.

Next, the hardware configuration of the DNS server 5 is described. FIG. 6 is a diagram for explaining the hardware configuration of the DNS server 5.

The DNS server 5, as illustrated in FIG. 6, includes a CPU 501 which is a processor, a memory 502, a communication device 503, and a storage medium 504. Those components are coupled to one another via a bus 505.

The storage medium 504 includes, for example, a program storage area (not illustrated) for storing a program 510 to perform control processing. The storage medium 504 also includes, for example, a storage section 530 (hereinafter also called an information storage area 530) that stores information that is used when the control processing is performed. The storage medium 504 may be, for example, an HDD or an SSD.

The CPU 501 executes the program 510 loaded from the storage medium 504 into the memory 502 to perform the control processing.

The communication device 503 performs communication with the terminal apparatus 3 and others via the network NW.

[Functions of Information Processing System]

Next, functions of the information processing system 10 are described.

[Functions of Terminal Apparatus]

Figure 7:
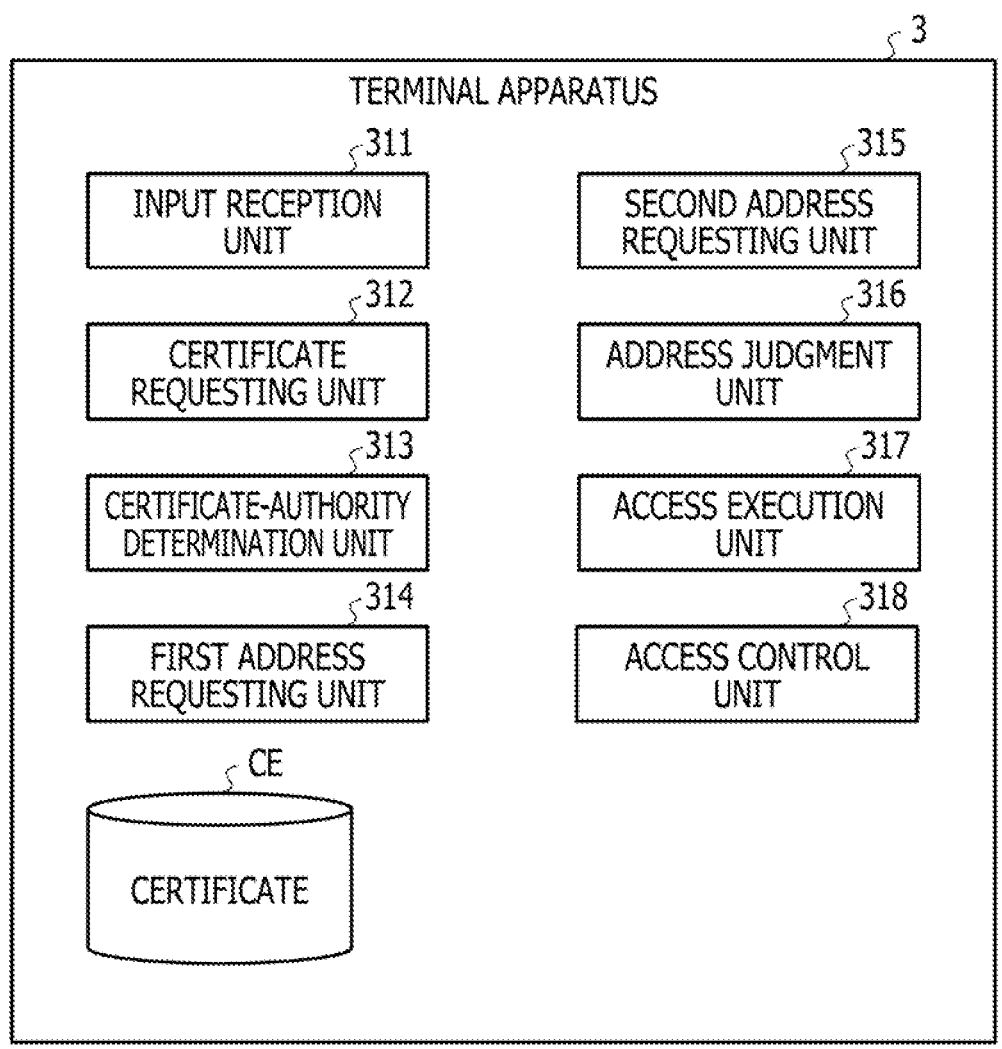
FIG. 7 is a block diagram of functions of the terminal apparatus 3.

First, functions of the terminal apparatus 3 are described. FIG. 7 is a block diagram of functions of the terminal apparatus 3.

As illustrated in FIG. 7, in the terminal apparatus 3, for example, hardware including the CPU 301 and the memory 302 and the program 310 work together organically to implement various functions including an input reception unit 311, certificate requesting unit 312, certificate-authority determination unit 313, first address requesting unit 314, second address requesting unit 315, address judgment unit 316, access execution unit 317, and access control unit 318.

The terminal apparatus 3, for example, stores certificates CE in the information storage area 330, as illustrated in FIG. 7.

The input reception unit 311, for example, receives an input of a request for access to the communication destination server 2. The input reception unit 311, for example, receives an access request that the operator inputs via the terminal apparatus 3.

The certificate requesting unit 312 transmits a request for transmission of the certificate CE for the communication destination server 2 to the CT log server 4 which manages certificates CE for multiple servers. The certificate requesting unit 312 receives the certificate CE for the communication destination server 2 transmitted from the CT log server 4. After that, the certificate requesting unit 312, for example, stores the received certificate CE for the communication destination server 2 in the information storage area 330.

The certificate-authority determination unit 313 determines the certificate authority server 1 that issued the certificate CE for the communication destination server 2, based on information included in the certificate CE for the communication destination server 2 received by the certificate requesting unit 312. The certificate-authority determination unit 313, for example, refers to the IP address included in the certificate for the communication destination server 2 to determine the certificate authority server 1 that issued the certificate CE for the communication destination server 2.

The first address requesting unit 314 transmits a request for transmission of the IP address of the communication destination server 2 to the certificate authority server 1 determined by the certificate-authority determination unit 313. The first address requesting unit 314, for example, transmits a request for transmission of the IP address of the communication destination server 2 and also part of the information included in the certificate CE for the communication destination server 2, to the certificate authority server 1. In this case, the first address requesting unit 314, for example, transmits the fully qualified domain name (FQDN) of the communication destination server 2 as the part of the information included in the certificate CE. In this case, the first address requesting unit 314, for example, transmits the FQDN of the communication destination server 2 and the identification number of the certificate CE for the communication destination server 2 as the part of the information included in the certificate CE. The first address requesting unit 314 receives the IP address of the communication destination server 2 transmitted from the certificate authority server 1.

The second address requesting unit 315 transmits a request for transmission of the IP address of the communication destination server 2 to the DNS server 5 which manages the IP addresses and the identification information pieces (for example, domain names or the like) of servers (including the communication destination server 2) with those associated with each other. For example, the second address requesting unit 315 transmits a request for transmission of the IP address of the communication destination server 2 and also the FQDN of the communication destination server 2, to the DNS server 5. The second address requesting unit 315 receives the IP address of the communication destination server 2 transmitted from the DNS server 5.

The address judgment unit 316 judges whether the IP address received by the first address requesting unit 314 agrees with the IP address received by the second address requesting unit 315.

For example, in the case where the address judgment unit 316 judged that the IP addresses agree with each other, the access execution unit 317 starts accessing the communication destination server 2.

For example, in the case where the address judgment unit 316 judged that the IP addresses do not agree with each other, the access control unit 318 limits access to the communication destination server 2.

[Functions of CT Log Server]

Figure 8:
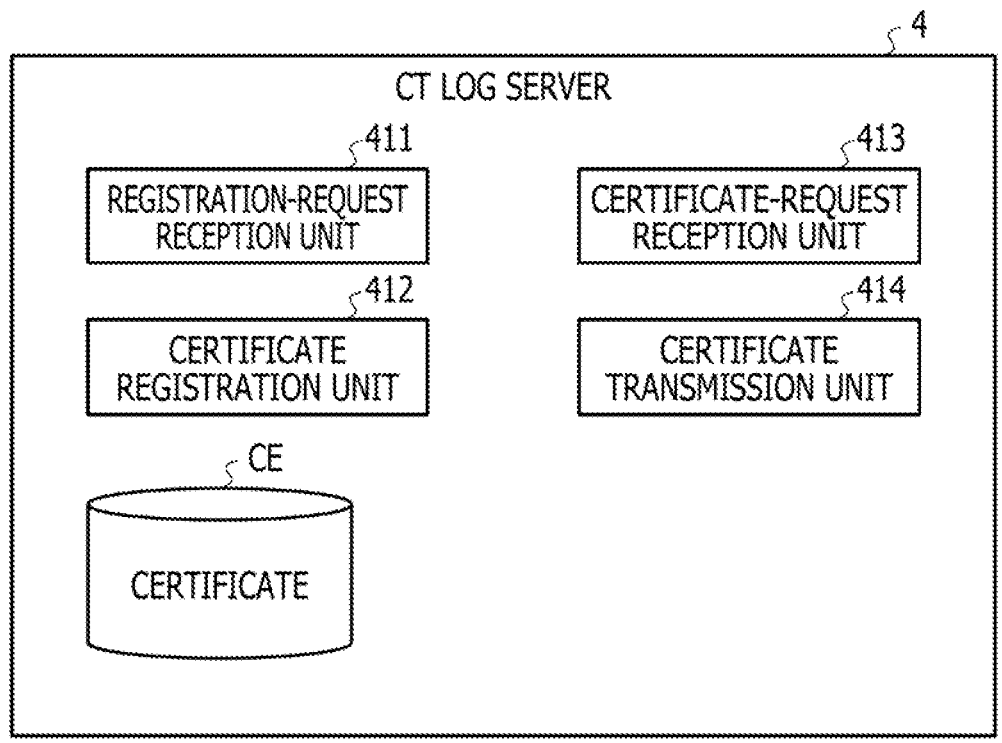
FIG. 8 is a block diagram of functions of the CT log server 4.

Next, functions of the CT log server 4 are described. FIG. 8 is a block diagram of functions of the CT log server 4.

As illustrated in FIG. 8, in the CT log server 4, for example, hardware including the CPU 401 and the memory 402 and the program 410 work together organically to implement various functions including a registration-request reception unit 411, certificate registration unit 412, certificate-request reception unit 413, and certificate transmission unit 414.

The CT log server 4, for example, stores certificates CE in the information storage area 430, as illustrated in FIG. 8.

The registration-request reception unit 411, for example, receives a request for registration of a certificate CE from the certificate authority server 1.

The certificate registration unit 412 stores (registers) the certificate CE corresponding to the registration request received by the registration-request reception unit 411 in the information storage area 430.

The certificate-request reception unit 413 receives a request for transmission of a certificate CE (the certificate CE for the communication destination server 2) from the terminal apparatus 3.

The certificate transmission unit 414 transmits the certificate CE corresponding to the transmission request received by the certificate-request reception unit 413 to the terminal apparatus 3.

[Functions of Communication Destination Server]

Figure 9:
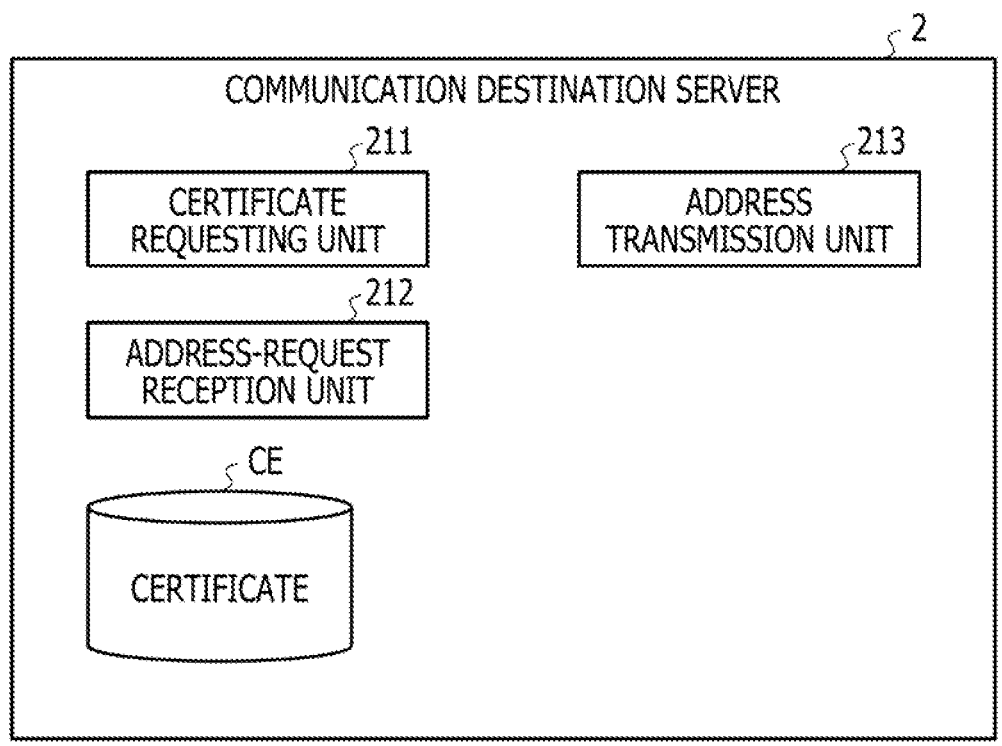
FIG. 9 is a block diagram of functions of the communication destination server 2.

Next, functions of the communication destination server 2 are described. FIG. 9 is a block diagram of functions of the communication destination server 2.

As illustrated in FIG. 9, in the communication destination server 2, for example, hardware including the CPU 201 and the memory 202 and the program 210 work together organically to implement various functions including a certificate requesting unit 211, address-request reception unit 212, and address transmission unit 213.

The communication destination server 2, for example, stores the certificate CE in the information storage area 230, as illustrated in FIG. 9.

The certificate requesting unit 211 transmits a request for transmission (a request for issuance) of the certificate CE for the communication destination server 2 to the certificate authority server 1. The certificate requesting unit 211 receives the certificate CE for the communication destination server 2 from the certificate authority server 1. After that, the certificate requesting unit 211, for example, stores the received certificate CE for the communication destination server 2 in the information storage area 230.

The address-request reception unit 212 receives a request for transmission of the IP address of the communication destination server 2 from the certificate authority server 1. The address-request reception unit 212, for example, receives a transmission request transmitted by the certificate authority server 1 via a specified path. The address-request reception unit 212, for example, receives a transmission request transmitted by the certificate authority server 1 to the mail address of the communication destination server 2.

The address transmission unit 213 transmits the IP address corresponding to the transmission request received by the address-request reception unit 212 to the certificate authority server 1.

[Functions of Certificate Authority Server]

Figure 10:
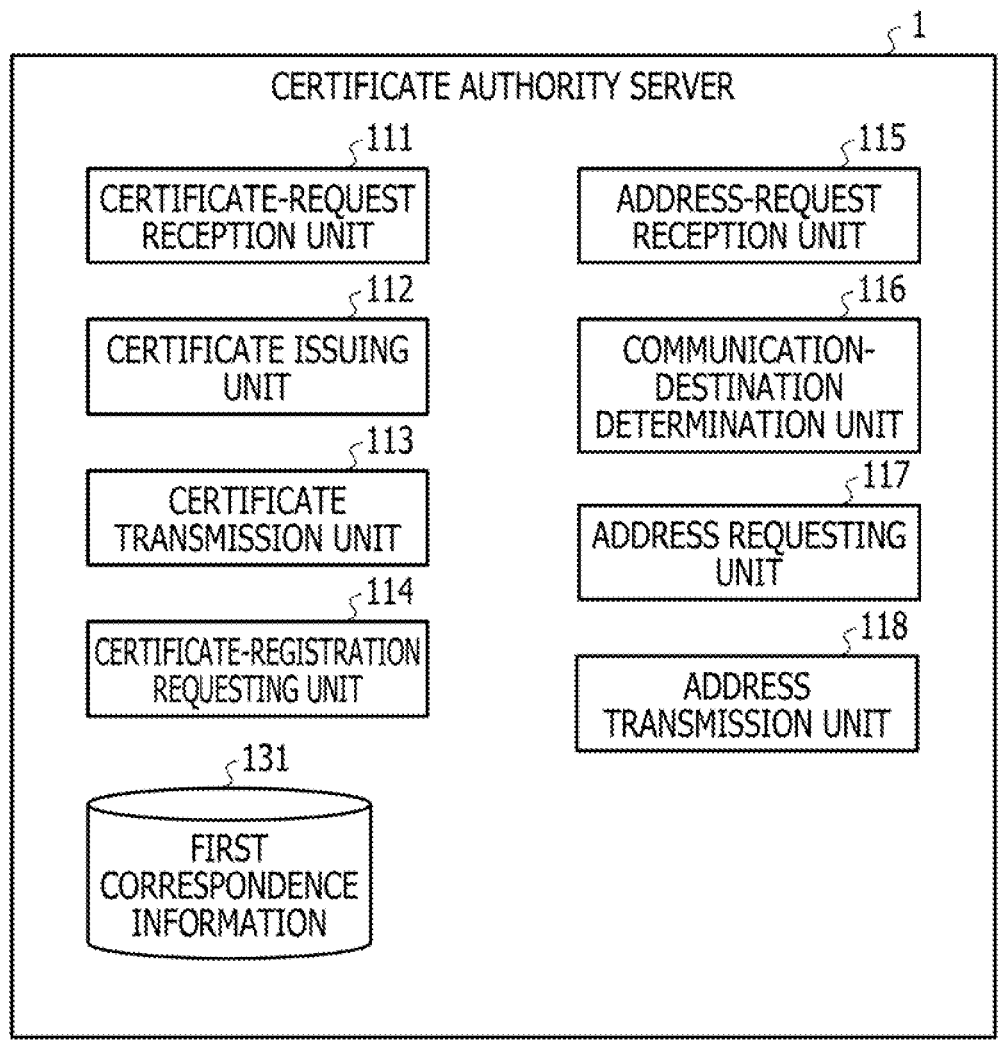
FIG. 10 is a block diagram of functions of the certificate authority server 1.

Next, functions of the certificate authority server 1 are described. FIG. 10 is a block diagram of functions of the certificate authority server 1.

As illustrated in FIG. 10, in the certificate authority server 1, for example, hardware including the CPU 101 and the memory 102 and the program 110 work together organically to implement various functions including a certificate-request reception unit 111, certificate issuing unit 112, certificate transmission unit 113, certificate-registration requesting unit 114, address-request reception unit 115, communication-destination determination unit 116, address requesting unit 117, and address transmission unit 118.

The certificate authority server 1, for example, stores first correspondence information 131 in the information storage area 130 as illustrated in FIG. 10.

The certificate-request reception unit 111, for example, receives a request for transmission (a request for issuance) of a certificate CE from the communication destination server 2.

The certificate issuing unit 112 issues the certificate CE corresponding to the transmission request (issuance request) received by the certificate-request reception unit 111.

The certificate transmission unit 113 transmits the certificate CE issued by the certificate issuing unit 112, to the communication destination server 2.

The certificate-registration requesting unit 114 transmits a request for registration of the certificate CE issued by the certificate issuing unit 112, to the CT log server 4.

The address-request reception unit 115 receives a request for transmission of the IP address of the communication destination server 2 from the terminal apparatus 3. The address-request reception unit 115, for example, receives a request for transmission of the IP address of the communication destination server 2 and also part of the information included in the certificate CE for the communication destination server 2 (for example, the FQDN of the communication destination server 2) from the terminal apparatus 3.

The communication-destination determination unit 116, for example, refers to the first correspondence information 131 stored in the information storage area 130 to determine the mail address corresponding to the transmission request received by the address-request reception unit 115. The first correspondence information 131 is, for example, information in which the FQDNs of servers (including the communication destination server 2) are associated with the mail addresses of the servers.

The address requesting unit 117, for example, transmits a request for transmission of the IP address of the communication destination server 2 to the mail address determined by the communication-destination determination unit 116. The address requesting unit 117 receives the IP address of the communication destination server 2 transmitted from the communication destination server 2.

The address transmission unit 118 transmits the IP address of the communication destination server 2 received by the address requesting unit 117 to the terminal apparatus 3.

[Functions of DNS Server]

Figure 11:
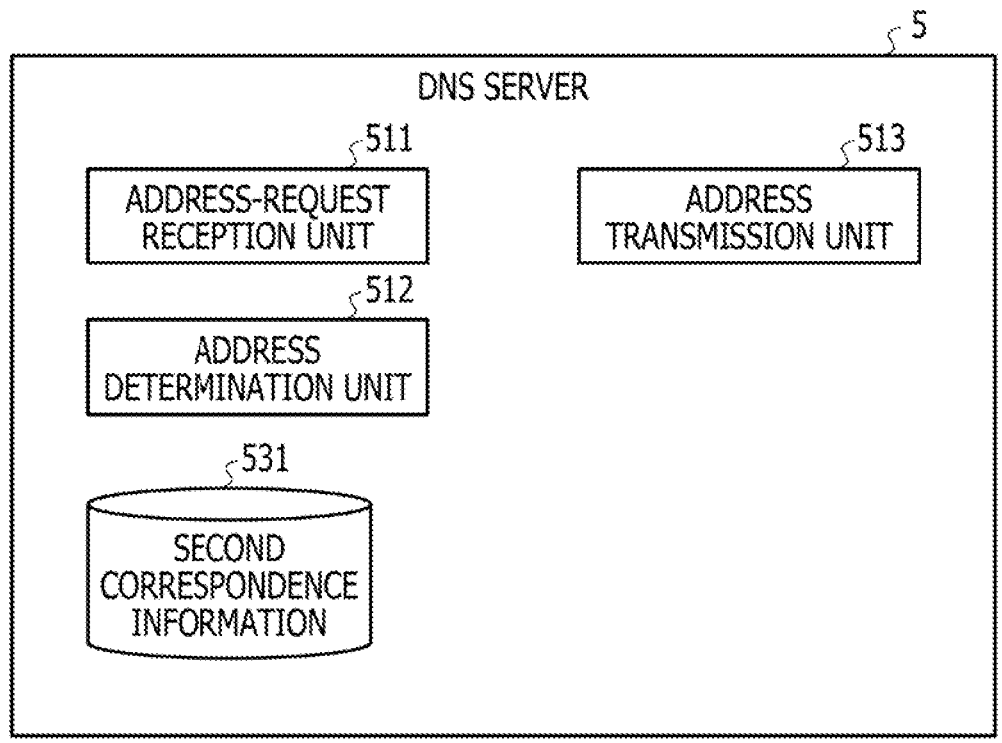
FIG. 11 is a block diagram of functions of the DNS server 5.

Next, functions of the DNS server 5 are described. FIG. 11 is a block diagram of functions of the DNS server 5.

As illustrated in FIG. 11, in the DNS server 5, for example, hardware including the CPU 501 and the memory 502 and the program 510 work together organically to implement various functions including an address-request reception unit 511, address determination unit 512, and address transmission unit 513.

The DNS server 5, for example, stores second correspondence information 531 in the information storage area 530, as illustrated in FIG. 11.

The address-request reception unit 511 receives a request for transmission of the IP address of the communication destination server 2 from the terminal apparatus 3.

The address determination unit 512 refers to the second correspondence information 531 stored in the information storage areas (including the information storage area 530) of multiple DNS servers including the DNS server 5 in a distributed manner and determines the IP address corresponding to the transmission request received by the address-request reception unit 511. The second correspondence information 531 is, for example, information in which the FQDNs of servers (including the communication destination server 2) are associated with the IP addresses of the servers.

For example, the address determination unit 512 refers to information included in the second correspondence information 531 stored in the information storage area 530 of the DNS server 5 and also information obtained from other DNS servers (information included in the second correspondence information 531 stored in the information storage areas of the other DNS servers) and determines the IP address corresponding to the transmission request received by the address-request reception unit 511.

The address transmission unit 513 transmits the IP address determined by the address determination unit 512 to the terminal apparatus 3.

[Outline of First Embodiment]

Figure 12:
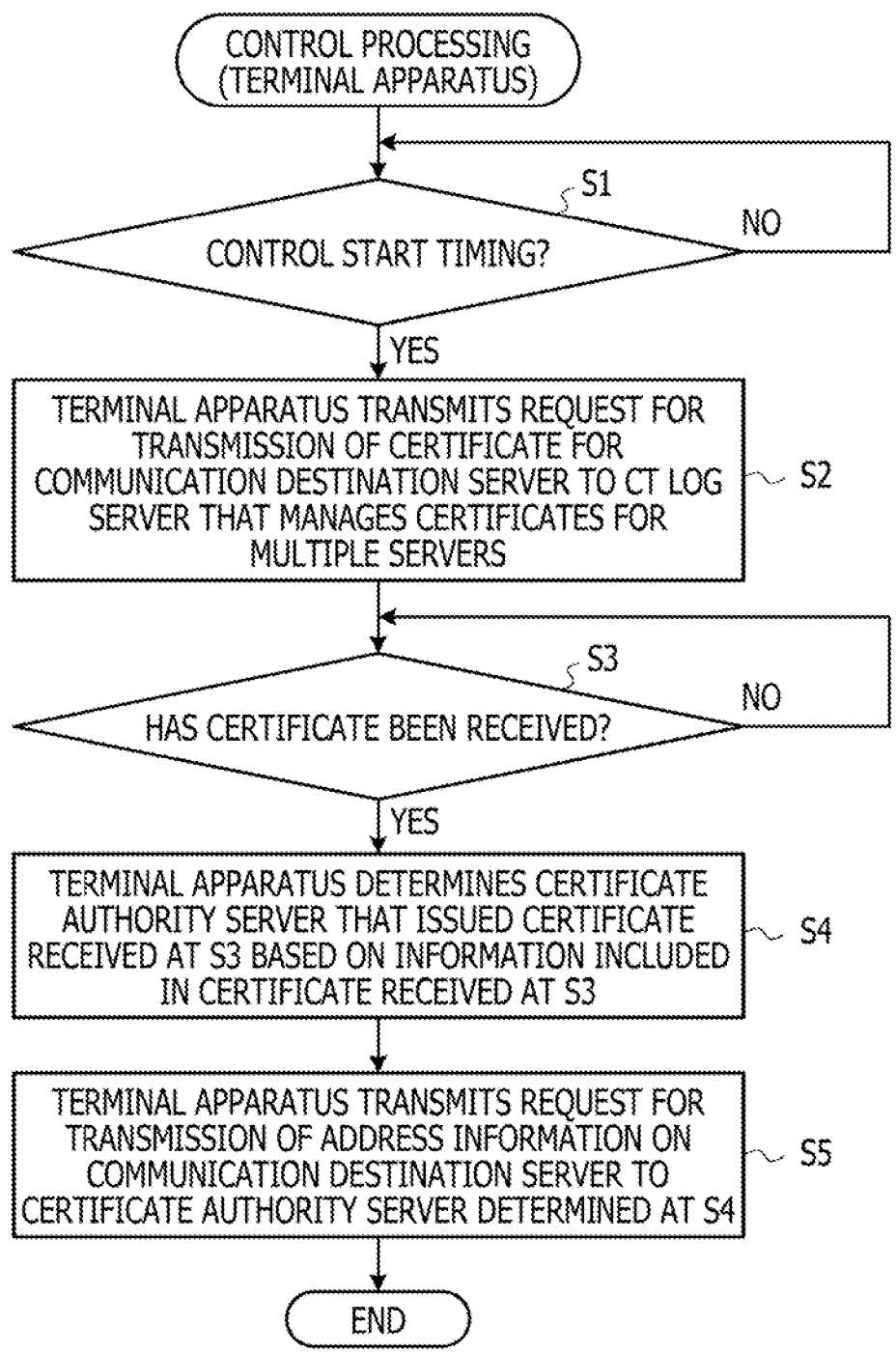
FIG. 12 is a flowchart diagram for explaining the outline of control processing in a first embodiment.
Figure 13:
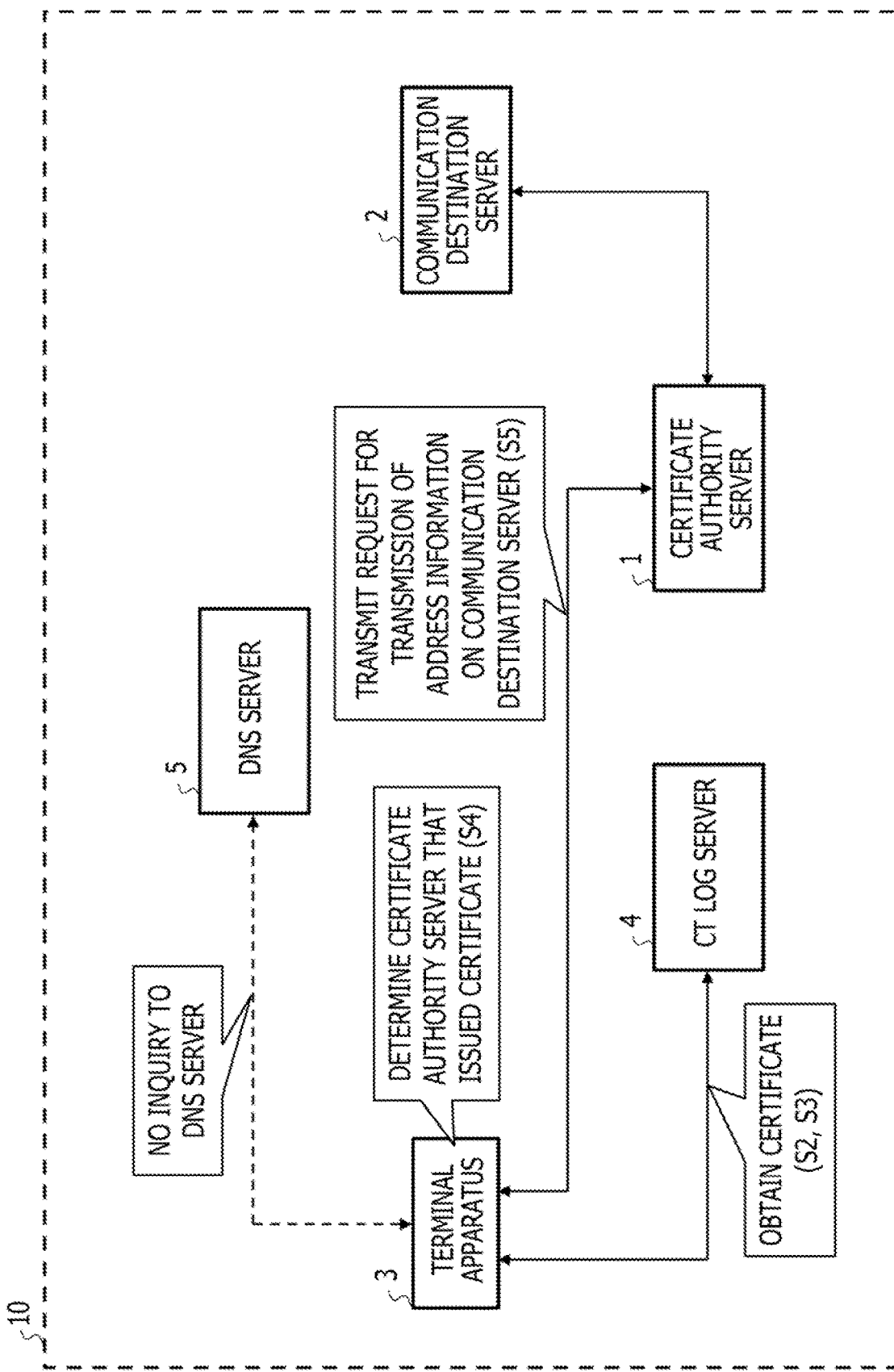
FIG. 13 is a diagram for explaining the outline of the control processing in the first embodiment.

Next, the outline of a first embodiment is described. FIG. 12 is a flowchart diagram for explaining the outline of control processing in the first embodiment. FIG. 13 is a diagram for explaining the outline of the control processing in the first embodiment.

The terminal apparatus 3 waits until a control timing, as illustrated in FIG. 12 (NO at S1). The control timing is, for example, a time when the operator transmits a request for access to the communication destination server 2, using the terminal apparatus 3.

When a control timing comes (YES at S1), the terminal apparatus 3 transmits a request for transmission of the certificate CE for the communication destination server 2, to the CT log server 4 which manages certificates CE for multiple servers (S2).

After that, the terminal apparatus 3 waits until the terminal apparatus 3 receives the certificate CE for the communication destination server 2 transmitted from the CT log server 4 (NO at S3).

When the terminal apparatus 3 receives the certificate CE for the communication destination server 2 transmitted from the CT log server 4 (YES at S3), the terminal apparatus 3 determines the certificate authority server 1 that issued the certificate CE received in the process at S3, based on information included in the certificate CE received in the process at S3 (S4).

After that, the terminal apparatus 3 transmits a request for transmission of address information on (the IP address of) the communication destination server 2 to the certificate authority server 1 determined in the process at S4 (S5).

In other words, for example, the terminal apparatus 3 in the present embodiment obtains the IP address of the communication destination server 2 without inquiring the IP address from the DNS server 5, as illustrated in FIG. 13.

This enables the terminal apparatus 3 to avoid obtaining an IP address that is not the desired IP address.

[Details of First Embodiment]

Next, details of the first embodiment are described. FIGS. 14 to 19 are flowchart diagrams for explaining details of control processing in the first embodiment. FIGS. 20 and 21 are diagrams for explaining details of the control processing in the first embodiment.

[Control Processing in Terminal Apparatus]

Figure 14:
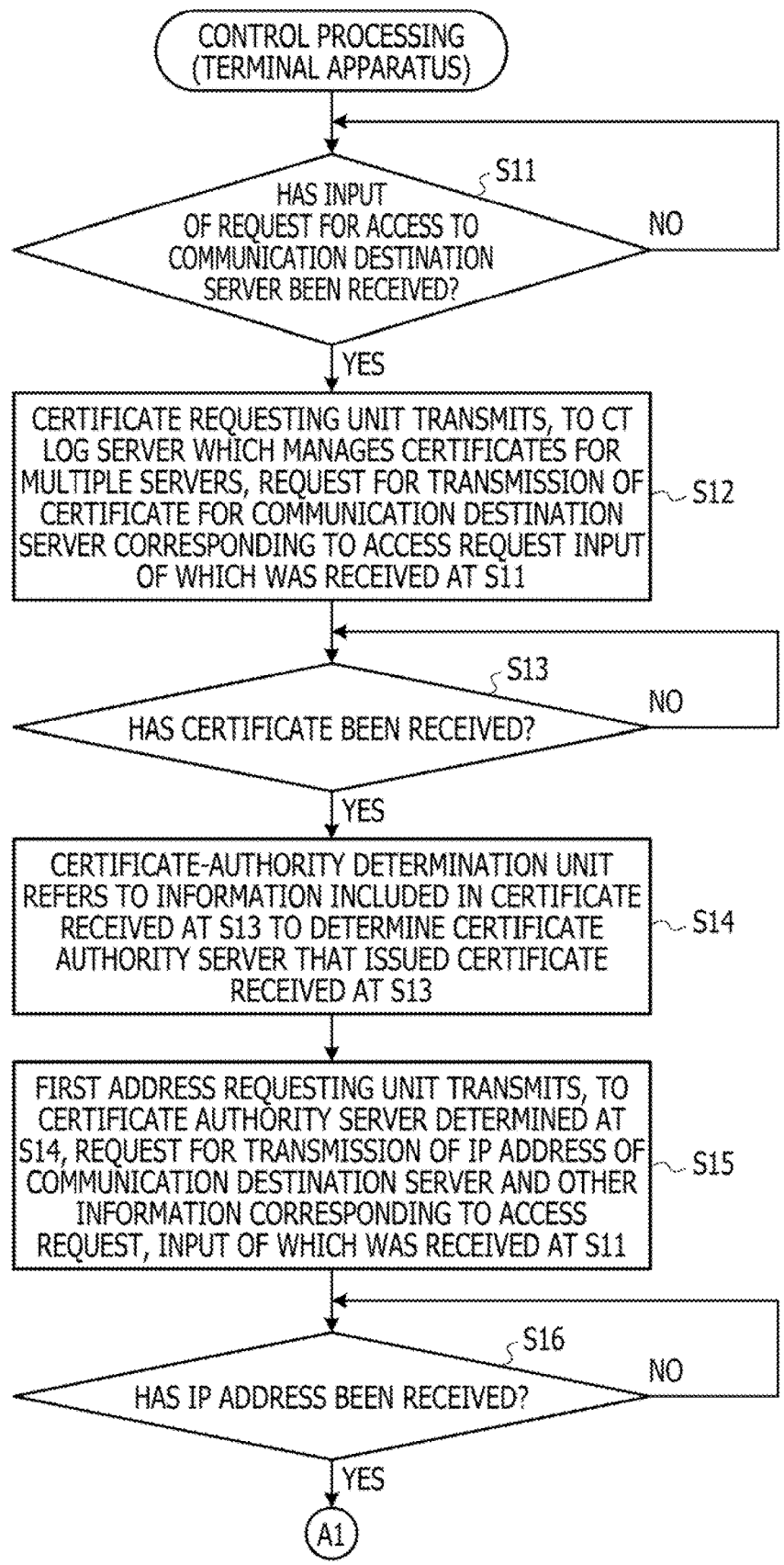
FIG. 14 is a flowchart diagram for explaining details of the control processing in the first embodiment.
Figure 15:
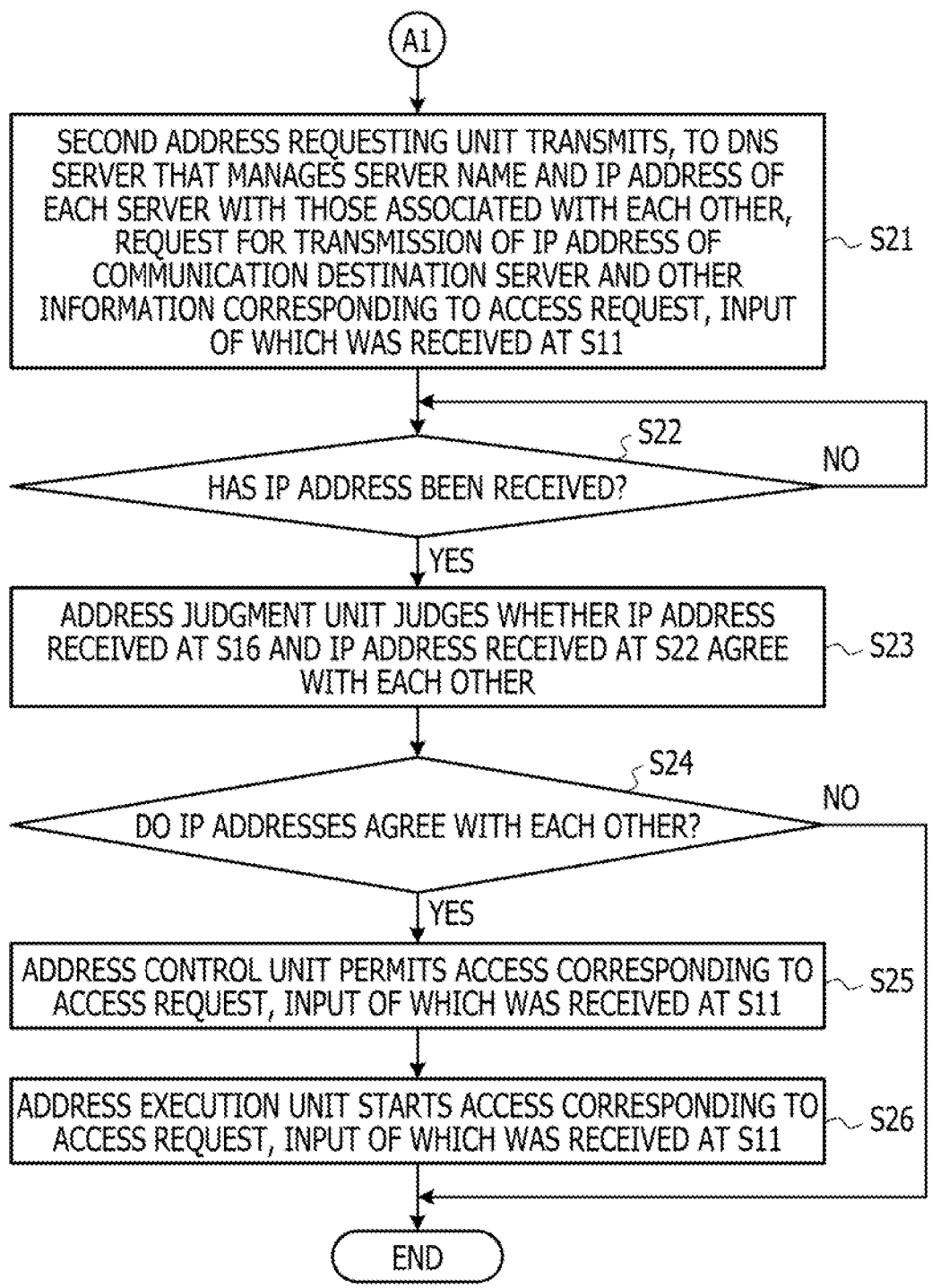
FIG. 15 is a flowchart diagram for explaining details of the control processing in the first embodiment.

First, control processing performed in the terminal apparatus 3 is described. FIGS. 14 and 15 are flowchart diagrams for explaining the control processing in the terminal apparatus 3.

As illustrated in FIG. 14, the input reception unit 311 of the terminal apparatus 3 waits until the input reception unit 311 receives an input of a request for access to the communication destination server 2 (NO at S11). For example, in the case where the communication destination server 2 is a web server, the input reception unit 311 waits until the input reception unit 311 receives an input of a request for viewing of web pages stored in the communication destination server 2.

When the input reception unit 311 receives an input of a request for access to the communication destination server 2 (YES at S11), the certificate requesting unit 312 of the terminal apparatus 3 transmits, to the CT log server 4 which manages certificates CE for multiple servers, a request for transmission of the certificate CE for the communication destination server 2 corresponding to the access request the input of which was received in the process at S11 (S12).

After that, the certificate requesting unit 312 waits until the certificate requesting unit 312 receives the certificate CE for the communication destination server 2 from the CT log server 4 (NO at S13).

When the certificate requesting unit 312 receives the certificate CE for the communication destination server 2 from the CT log server 4 (YES at S13), the certificate-authority determination unit 313 of the terminal apparatus 3 refers to information included in the certificate CE received in the process at S13 to determine the certificate authority server 1 that issued the certificate CE received in the process at S13 (S14).

The certificate-authority determination unit 313, for example, refers to the IP address of the certificate authority server that issued the certificate CE among the information pieces included in the certificate CE received in the process at S13 and thereby determines the certificate authority server 1 that issued the certificate CE received in the process at S13.

Next, the first address requesting unit 314 of the terminal apparatus 3 transmits, to the certificate authority server 1 determined in the process at S14, a request for transmission of the IP address of the communication destination server 2 corresponding to the access request the input of which was received in the process at S11, and also part of the information included in the certificate CE received in the process at S13 (S15).

The first address requesting unit 314, for example, transmits a request for transmission of the IP address of the communication destination server 2 corresponding the access request the input of which was received in the process at S11 and also the FQDN of the communication destination server 2 included in the certificate CE received in the process at S13.

After that, the first address requesting unit 314 waits until the first address requesting unit 314 receives the IP address of the communication destination server 2 from the certificate authority server 1 (NO at S16).

When the first address requesting unit 314 receives the IP address of the communication destination server 2 from the certificate authority server 1 (YES at S16), the second address requesting unit 315 of the terminal apparatus 3, as illustrated in FIG. 15, transmits, to the DNS server 5 which manages the identification information pieces and the IP addresses of servers with those associated with each other, a request for transmission of the IP address of the communication destination server 2 corresponding to the access request the input of which was received in the process at S11 and also the identification information on the communication destination server 2 (for example, the FQDN) (S21).

After that, the second address requesting unit 315 waits until the second address requesting unit 315 receives the IP address of the communication destination server 2 from the DNS server 5 (NO at S22).

When the second address requesting unit 315 receives the IP address of the communication destination server 2 from the DNS server 5 (YES at S22), the address judgment unit 316 of the terminal apparatus 3 judges whether the IP address received in the process at S16 and the IP address received in the process at S22 agree with each other (S23).

In the case where it is judged that the IP addresses agree with each other (YES at S24), the access control unit 318 of the terminal apparatus 3 permits access corresponding to the access request the input of which was received in the process at S11 (S25).

In other words, for example, the terminal apparatus 3 obtains the IP address of the communication destination server 2 from the certificate authority server 1 by using information included in the certificate CE for the communication destination server 2 received from the CT log server 4. The terminal apparatus 3 also obtains the IP address of the communication destination server 2 from the DNS server 5. In the case where the IP addresses obtained in the different ways agree with each other, the terminal apparatus 3 judges that the IP address transmitted from the DNS server 5 is valid as the IP address of the communication destination server 2 and permits access to the IP address.

After that, the access execution unit 317 of the terminal apparatus 3 starts access corresponding to the access request the input of which was received in the process at S11 (S26).

In contrast, in the case where it is judged that the IP addresses do not agree with each other (NO at S24), the access control unit 318 and the access execution unit 317 do not perform the processes at S25 and S26.

For example, in the case where the IP address obtained from the certificate authority server 1 and the IP address obtained from the DNS server 5 do not agree with each other, the terminal apparatus 3 judges that it is possible that the DNS server 5 and others have been attacked, and that the IP address that the terminal apparatus 3 received was transmitted from a fake DNS server and does not permit access to the IP address.

This enables the terminal apparatus 3, for example, to avoid accessing an IP address transmitted from a fake DNS server.

[Control Processing in CT Log Server]

Figure 16:
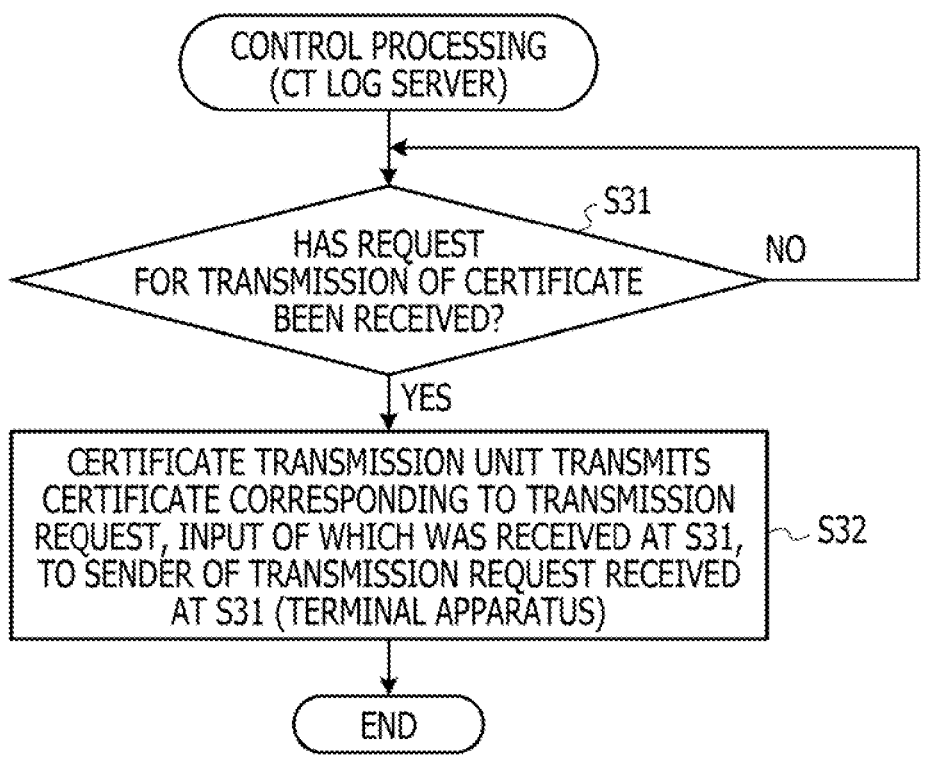
FIG. 16 is a flowchart diagram for explaining details of the control processing in the first embodiment.

Next, control processing performed in the CT log server 4 is described. FIG. 16 is a flowchart diagram for explaining the control processing in the CT log server 4.

The certificate-request reception unit 413 of the CT log server 4, as illustrated in FIG. 16, waits until the certificate-request reception unit 413 receives a request for transmission of a certificate CE from the terminal apparatus 3 (NO at S31).

When the CT log server 4 receives a request for transmission of a certificate CE from the terminal apparatus 3 (YES at S31), the certificate transmission unit 414 of the CT log server 4 transmits the certificate corresponding to the transmission request received in the process at S31 to the sender of the transmission request received in the process at S41 (the terminal apparatus 3) (S32).

[Control Processing in Certificate Authority Server]

Figure 17:
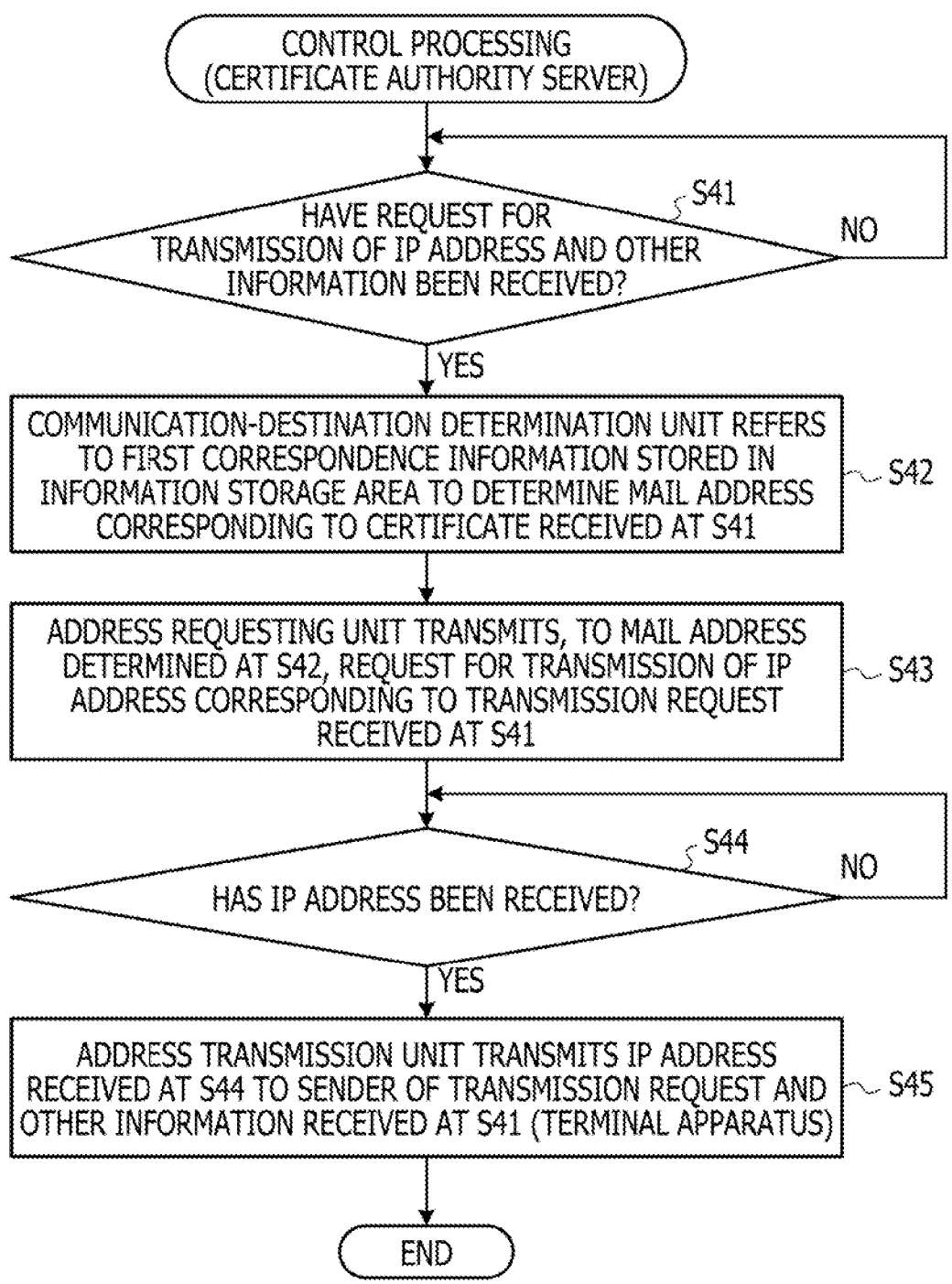
FIG. 17 is a flowchart diagram for explaining details of the control processing in the first embodiment.

Next, control processing performed in the certificate authority server 1 is described. FIG. 17 is a flowchart diagram for explaining the control processing in the certificate authority server 1.

The address-request reception unit 115 of the certificate authority server 1, as illustrated in FIG. 17, waits until the address-request reception unit 115 receives a request for transmission of the IP address of the communication destination server 2 and part of the information included in the certificate CE for the communication destination server 2 (for example, the FQDN of the communication destination server 2) from the terminal apparatus 3 (NO at S41).

When the address-request reception unit 115 receives a request for transmission of the IP address of the communication destination server 2 and other information from the terminal apparatus 3 (YES at S41), the communication-destination determination unit 116 of the certificate authority server 1 refers to the first correspondence information 131 stored in the information storage area 130 and determines the mail address corresponding to the certificate CE received in the process at S41 (S42). In other words, the communication-destination determination unit 116, in this case, for example, determines the mail address used when the certificate authority server 1 issued the certificate CE for the communication destination server 2. In the following, specific examples of the first correspondence information 131 are described.

[Specific Examples of First Correspondence Information]

FIG. 20 is a diagram for explaining specific examples of the first correspondence information 131.

The first correspondence information 131 illustrated in FIG. 20 has the following items: "Item number" for identifying each information piece included in the first correspondence information 131, "FQDN" in which the FQDNs of servers are set, and "mail address" in which the mail addresses of the servers are set.

In the first correspondence information 131 illustrated in FIG. 20, for example, the information with the "item number" being "1" has "server01.AAA.c.jp" set as the "FQDN" and "xxx@AAA.co.jp" set as the "mail address".

In the first correspondence information 131 illustrated in FIG. 20, for example, the information with the "item number" being "2" has "server02.BBB.co.jp" set as the "FQDN" and "yyy@BBB.co.jp" set as the "mail address". Explanation on the other information included in FIG. 20 is omitted.

Hence, for example, in the case where the FQDN of the communication destination server 2 received in the process at S41 is "server01.AAA.co.jp", the communication-destination determination unit 116 determines that the mail address of the communication destination server 2 is "xxx@AAA.co.jp".

Returning to FIG. 17, the address requesting unit 117 transmits a request for transmission of the IP address corresponding to the transmission request received in the process at S41, to the mail address determined in the process at S42 (S43).

After that, the address requesting unit 117 waits until the address requesting unit 117 receives the IP address corresponding to the transmission request received in the process at S41 from the communication destination server (NO at S44).

When the address requesting unit 117 receives the IP address corresponding to the transmission request received in the process at S41, from the communication destination server 2 (YES at S44), the address transmission unit 118 of the terminal apparatus 3 transmits the IP address received in the process at S44 (the IP address of the communication destination server 2) to the sender of the transmission request and other information received in the process at S41 (the terminal apparatus 3) (S45).

[Control Processing in Communication Destination Server]

Figure 18:
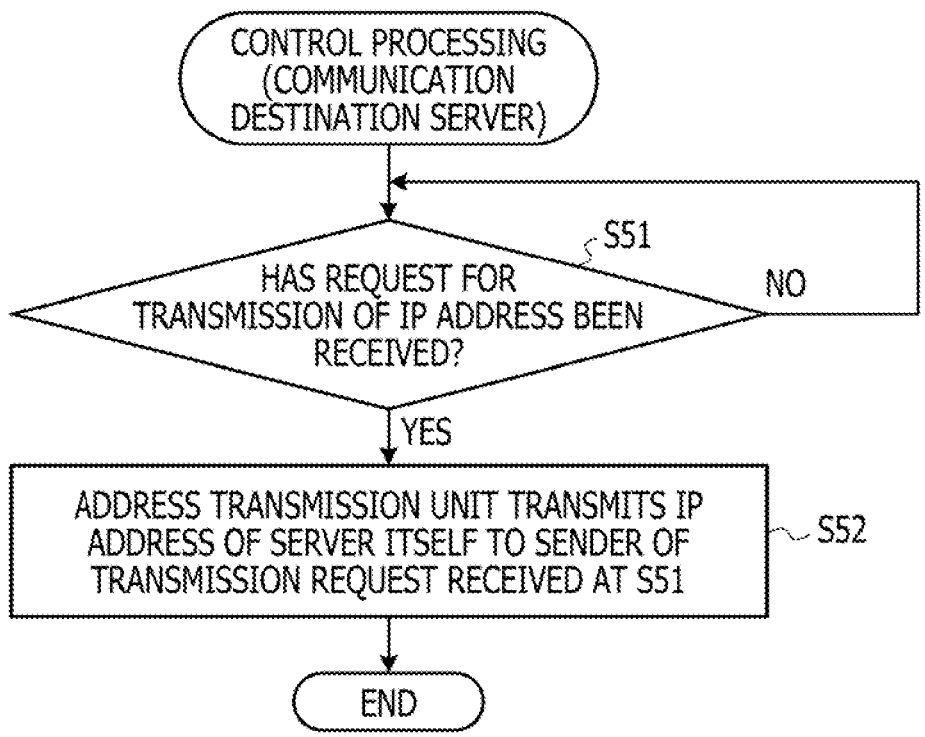
FIG. 18 is a flowchart diagram for explaining details of the control processing in the first embodiment.

Next, control processing performed in the communication destination server 2 is described. FIG. 18 is a flowchart diagram for explaining the control processing in the communication destination server 2.

The address-request reception unit 212 of the communication destination server 2 waits until the address-request reception unit 212 receives a request for transmission of an IP address from the certificate authority server 1, as Illustrated in FIG. 18 (NO at S51).

For example, the address-request reception unit 212 periodically accesses a mail server (not illustrated) of the communication destination server 2 to obtain newly arrived mail. For example, when there is mail received from the certificate authority server 1 in the mail server, the address-request reception unit 212 also obtains the mail transmitted from the certificate authority server 1.

When the address-request reception unit 212 receives a request for transmission of the IP address from the certificate authority server 1 (YES at S52), the address transmission unit 213 of the communication destination server 2 transmits the IP address of the server itself to the sender of the transmission request received in the process at S51 (certificate authority server 1) (S52).

[Control Processing in DNS Server]

Figure 19:
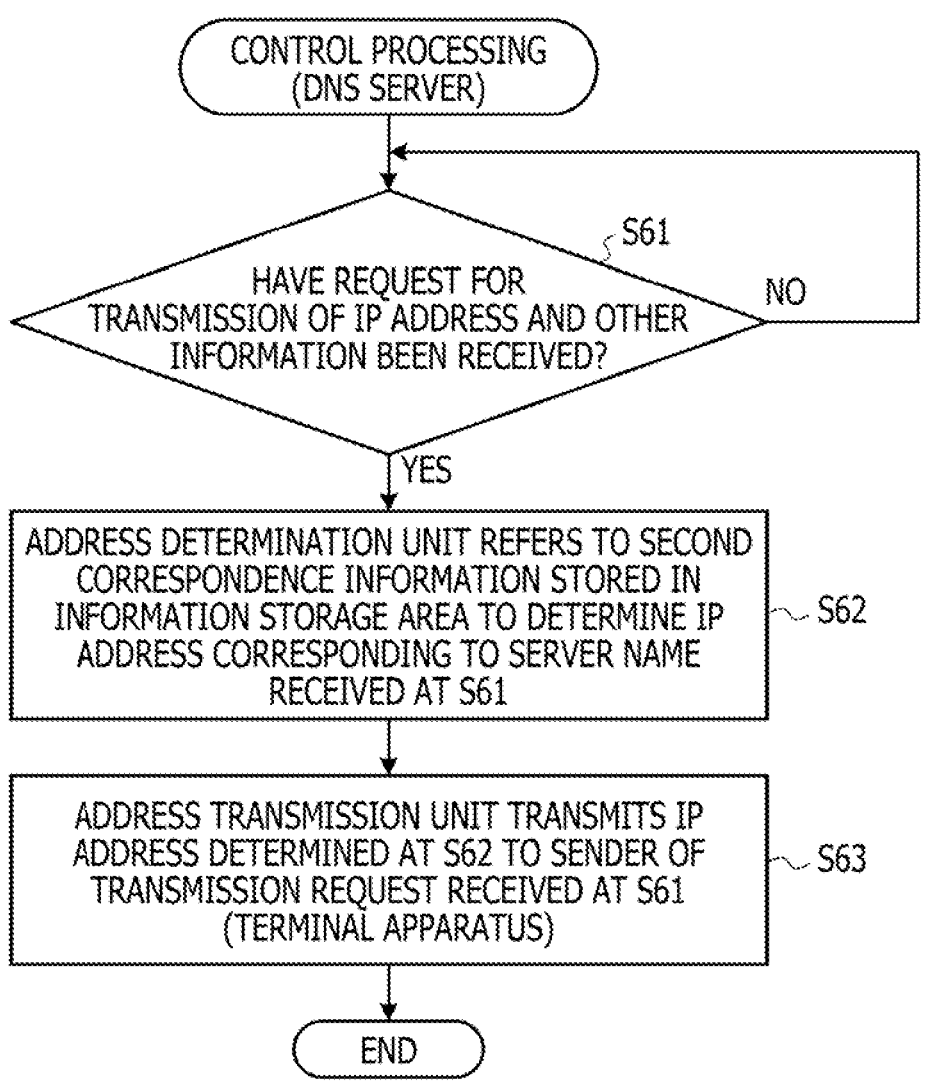
FIG. 19 is a flowchart diagram for explaining details of the control processing in the first embodiment.

Next, control processing performed in the DNS server 5 is described. FIG. 19 is a flowchart diagram for explaining control processing in the DNS server 5.

The address-request reception unit 115 of the DNS server 5, as illustrated in FIG. 19, receives a request for transmission of the IP address of the communication destination server 2 and the FQDN of the communication destination server 2 from the terminal apparatus 3 (NO at S61).

When the address-request reception unit 115 receives a request for transmission of the IP address of the communication destination server 2 and other information from the terminal apparatus 3 (YES at S61), the address determination unit 512 of the DNS server 5 refers to the second correspondence information 531 stored in the information storage area 530 and the like to determine the IP address corresponding to the FQDN received in the process at S61 (S62). In the following, specific examples of the second correspondence information 531 are described.

[Specific Example of Second Correspondence Information]

FIG. 21 is a diagram for explaining specific examples of the second correspondence information 531.

The second correspondence information 531 illustrated in FIG. 21 has the following items: "item number" for identifying each information piece included in the second correspondence information 531, "FQDN" in which the FQDNs of servers are set, and "IP address" in which the IP addresses of the servers are set.

In the second correspondence information 531 illustrated in FIG. 21, for example, the information with the "item number" being "1" has "server01.AAA.co.jp" set as the "FQDN" and "111.111.111.111" set as the "IP address".

In the second correspondence information 531 illustrated in FIG. 21, for example, the information with the "item number" being "2" has "server02.BBB.co.jp" set as the "FQDN" and "222.222.222.222" set as the "IP address". Explanation on the other information included in FIG. 21 is omitted.

Hence, for example, in the case where the FQDN of the communication destination server 2 received in the process at S61 is "server01.AAA.co.jp", the communication-destination determination unit 116 determines that the IP address of the communication destination server 2 is "111.111.111.111".

Returning to FIG. 19, the address transmission unit 513 of the DNS server 5 transmits the IP address determined in the process at S62 to the sender of the transmission request received in the process at S61 (the terminal apparatus 3) (S63).

As described above, the terminal apparatus 3 in the first embodiment transmits a request for transmission of the certificate CE for the communication destination server 2, to the CT log server 4 which manages certificates CE for multiple servers. When the terminal apparatus 3 receives the certificate CE for the communication destination server 2 from the CT log server 4, the terminal apparatus 3 determines the certificate authority server 1 that issued the received certificate CE, based on information included in the received certificate CE. After that, the terminal apparatus 3 transmits a request for transmission of the IP address of the communication destination server 2 to the determined certificate authority server 1.

In other words, for example, the terminal apparatus 3 in the first embodiment obtains the IP address of the communication destination server 2 without inquiring the IP address from the DNS server 5. When the terminal apparatus 3 in the first embodiment receives an input of a request for access to the communication destination server 2, the terminal apparatus 3 does not permit access corresponding to the request for access to the communication destination server 2 until it is judged that the IP addresses agree with each other in the process at S23.

This enables the terminal apparatus 3 to avoid accessing an IP address that is not the desired IP address (for example, an IP address transmitted from a fake DNS server).

[Second Embodiment]

Figure 22:
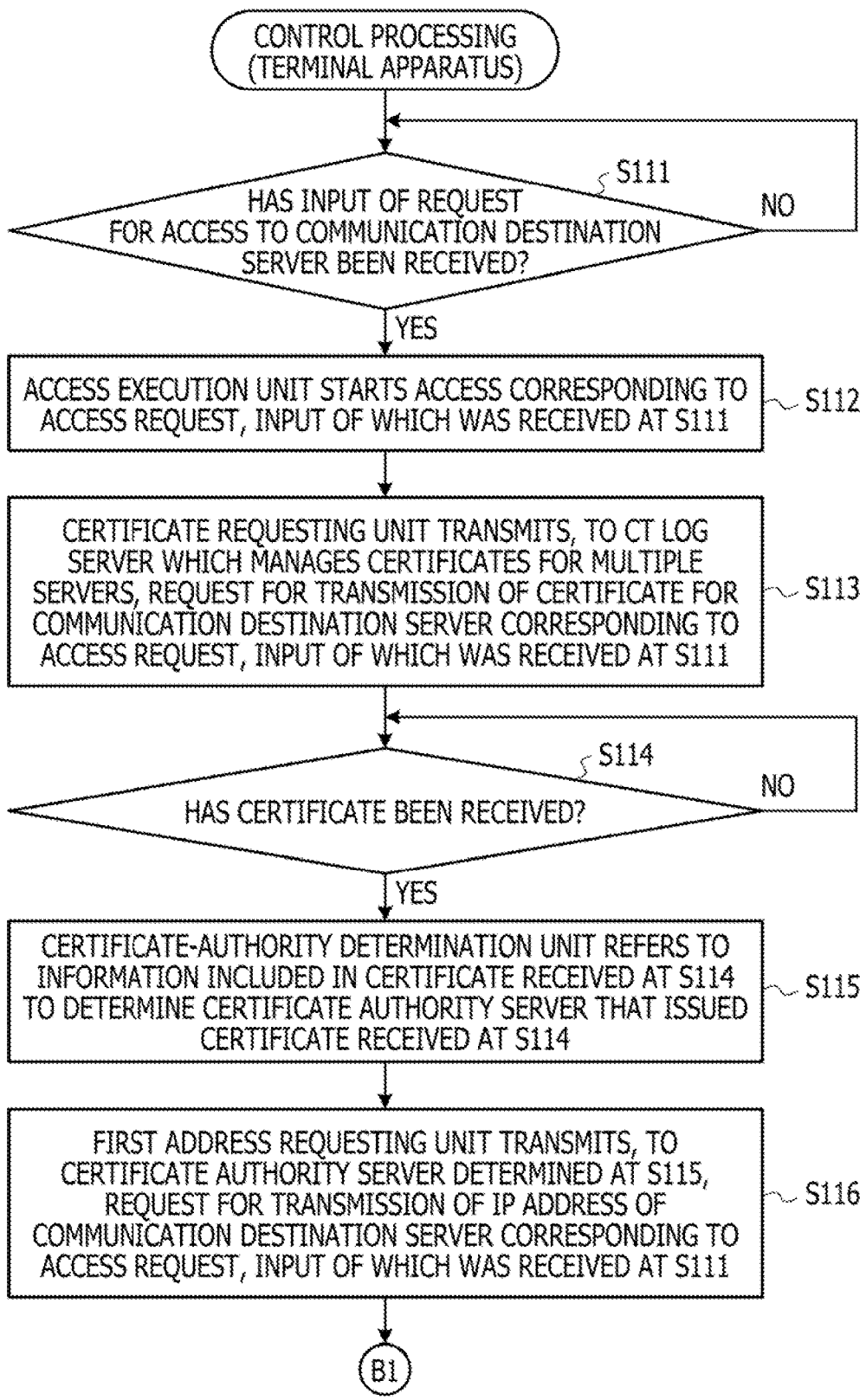
FIG. 22 is a flowchart diagram for explaining control processing in a second embodiment.
Figure 23:
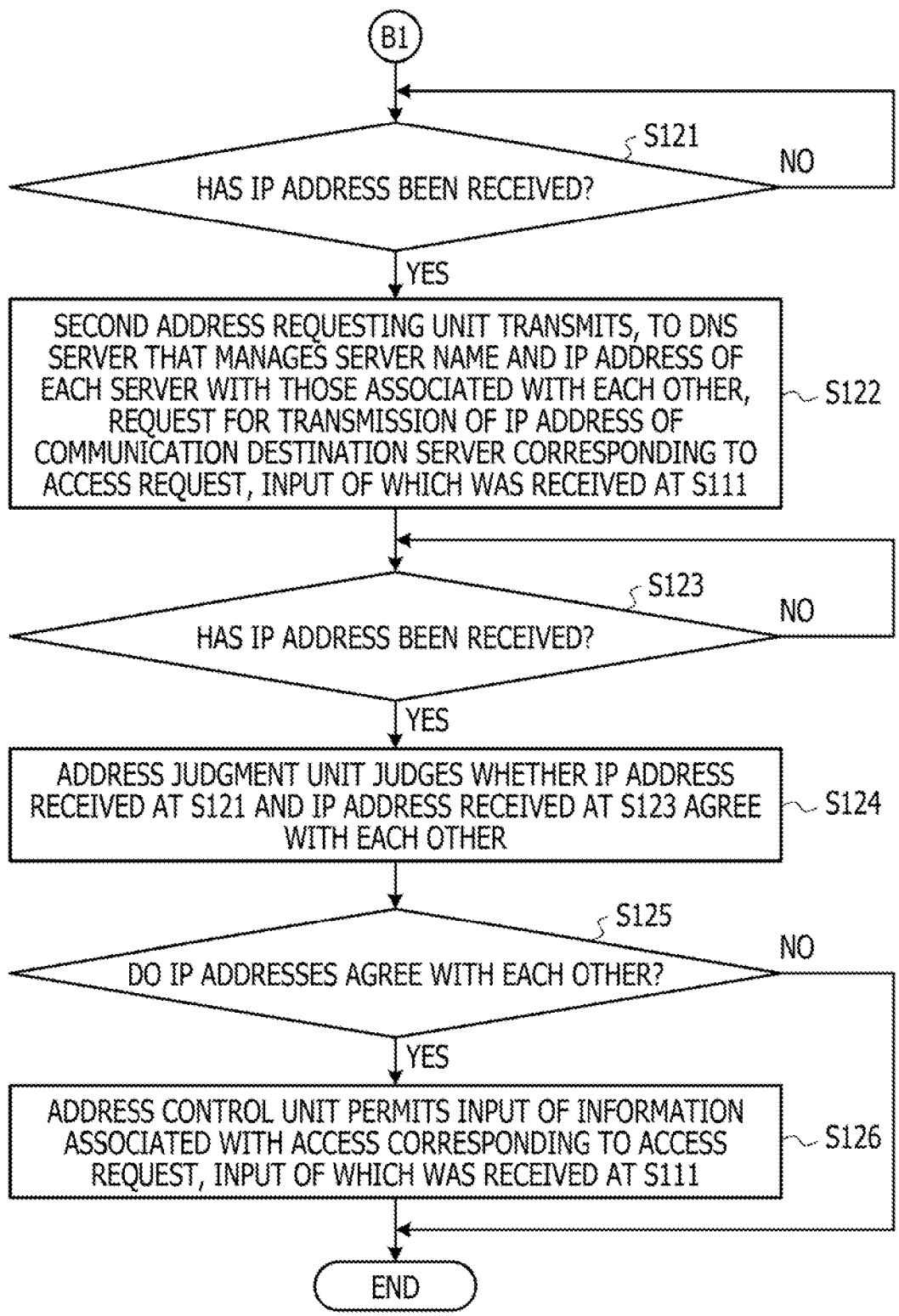
FIG. 23 is a flowchart diagram for explaining the control processing in the second embodiment.

Next, a second embodiment is described. FIGS. 22 and 23 are flowchart diagrams for explaining control processing in the second embodiment. Note that in the control processing in the second embodiment, the processing in the CT log server 4, the processing in the certificate authority server 1, the processing in the communication destination server 2, and the processing in the DNS server 5 are the same as that in the control processing in the first embodiment, and hence, description thereof is omitted.

[Control Processing in Terminal Apparatus]

As illustrated in FIG. 22, the input reception unit 311 waits until the input reception unit 311 receives an input of a request for access to the communication destination server 2 (NO at S111).

When a terminal apparatus 3 receives an input of a request for access to the communication destination server 2 (YES at S111), the access execution unit 317 starts access corresponding to the access request the input of which was received in the process at S111 (S112).

In other words, for example, in response to reception of a request for access to the communication destination server 2, the terminal apparatus 3 in the second embodiment starts access corresponding to the access request.

This enables the terminal apparatus 3 to perform access corresponding to the access request without waiting for the execution of the control processing to finish. Thus, for example, even in the case where the execution of the control processing takes time, it is possible for the terminal apparatus 3 to promptly start access corresponding to the access request.

In this case, the terminal apparatus 3 in the second embodiment prohibits information input associated with the access corresponding to the access request.

This enables the terminal apparatus 3 to avoid the operator's personal information or the like being inputted to a fake DNS server or the like.

The certificate requesting unit 312 transmits, to the CT log server 4 which manages certificates CE for multiple servers, a request for transmission of the certificate CE for the communication destination server 2 corresponding to the access request the input of which was received in the process at S111 (S113).

After that, the certificate requesting unit 312 waits until the certificate requesting unit 312 receives the certificate CE for the communication destination server 2 from the CT log server 4 (NO at S114).

When the certificate requesting unit 312 receives the certificate CE for the communication destination server 2 from the CT log server 4 (YES at S114), the certificate-authority determination unit 313 refers to information included in the certificate CE received in the process at S114 to determine the certificate authority server 1 that issued the certificate CE received in the process at S114 (S115).

Next, the first address requesting unit 314 transmits, to the certificate authority server 1 determined in the process at S115, the IP address of the communication destination server 2 corresponding to the access request the input of which was received in the process at S111 and also part of the information included in the certificate CE received in the process at S114 (for example, the FQDN of the communication destination server 2) (S116).

After that, as illustrated in FIG. 23, the first address requesting unit 314 waits until the first address requesting unit 314 receives the IP address of the communication destination server 2 from the certificate authority server 1 (NO at S121).

When the first address requesting unit 314 receives the IP address of the communication destination server 2 from the certificate authority server 1 (YES at S121), the second address requesting unit 315 transmits, to the DNS server 5 which manages the identification information pieces and the IP addresses of servers with those associated with each other, a request for transmission of the IP address of the communication destination server 2 corresponding to the access request the input of which was received in the process at S111 and also the FQDN of the communication destination server 2 (S122).

After that, the second address requesting unit 315 waits until the second address requesting unit 315 receives the IP address of the communication destination server 2 from the DNS server 5 (NO at S123).

When the second address requesting unit 315 receives the IP address of the communication destination server 2 from the DNS server 5 (YES at S123), the address judgment unit 316 judges whether the IP address received in the process at S16 and the IP address received in the process at S123 agree with each other (S124).

In the case where it is judged that the IP addresses agree with each other (YES at S125), the access control unit 318 permits information input associated with the access corresponding to the access request the input of which was received in the process at S111 (S126).

For example, in the case where the IP addresses obtained in the different ways agree with each other, the terminal apparatus 3 judges that the IP address transmitted from the DNS server 5 is valid as the IP address of the communication destination server 2 and permits information input performed along with the access to the IP address.

This enables the terminal apparatus 3 to promptly start access corresponding to the access request and also to perform control such that the operator's personal information or the like will not be inputted to a fake DNS server or the like.

[Third Embodiment]

Next, a third embodiment is described.

[Functions of Terminal Apparatus]

Figure 24:
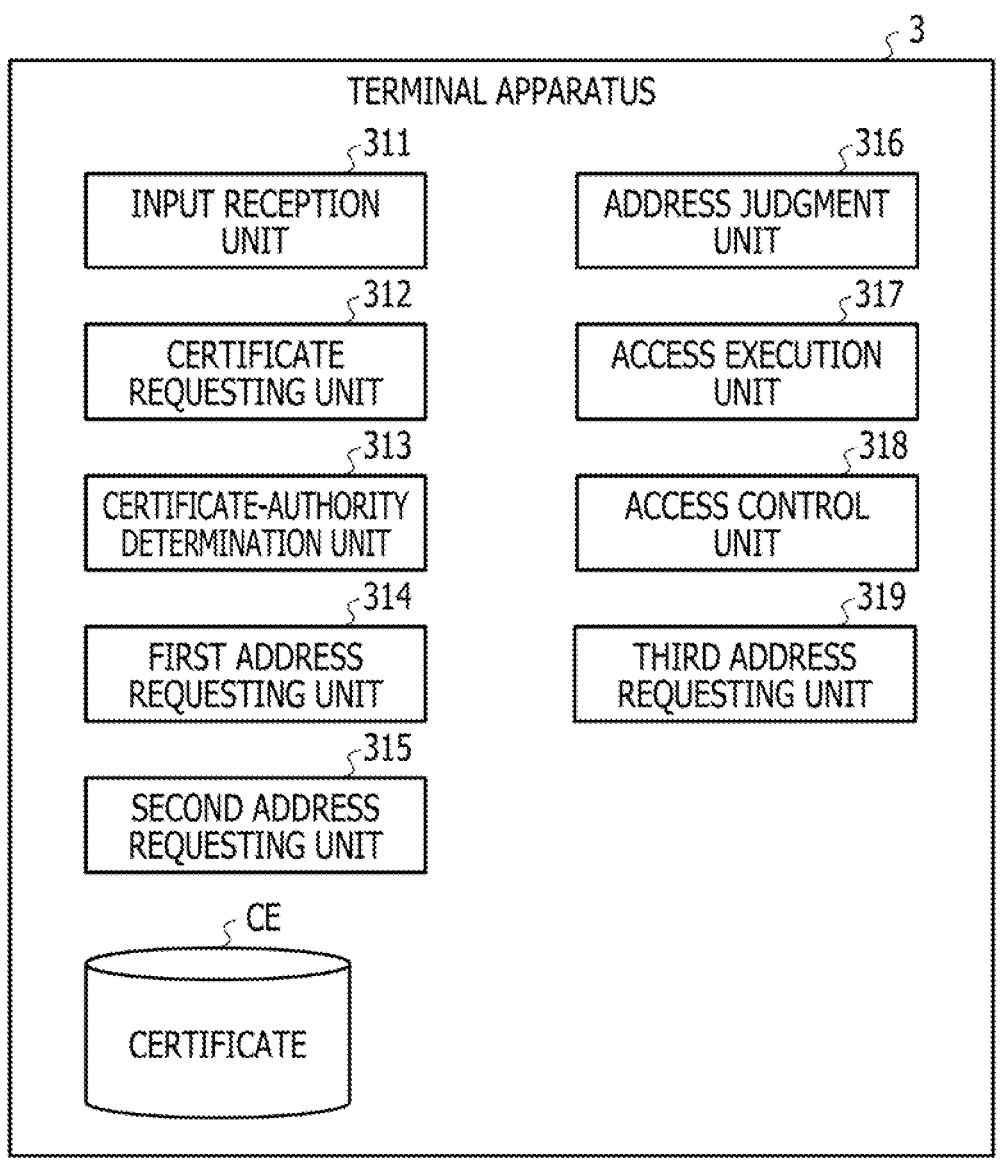
FIG. 24 is a block diagram of functions of a terminal apparatus 3 in a third embodiment.

First, functions of a terminal apparatus 3 in the third embodiment are described. FIG. 24 is a block diagram of functions of the terminal apparatus 3 in the third embodiment. Note that the functions in the CT log server 4, the functions in the certificate authority server 1, the functions in the communication destination server 2, and the functions in the DNS server 5 in the third embodiment are the same as those in the control processing in the first and second embodiments, and hence, description thereof is omitted.

As Illustrated in FIG. 24, in the terminal apparatus 3, for example, hardware including the CPU 301 and the memory 302 and the program 310 work together organically to implement a third address requesting unit 319 in addition to the various functions described with reference to FIG. 7.

The terminal apparatus 3, for example, stores certificates CE in the information storage area 330 in the same or similar manner described with reference to FIG. 7.

The third address requesting unit 319 transmits a request for transmission of the IP address of the communication destination server 2 to a DNS cache server (not illustrated). The DNS cache server is a server that stores the IP address transmitted from the DNS server 5 in response to an inquiry from the terminal apparatus 3. The third address requesting unit 319 receives the IP address of the communication destination server 2 transmitted from the DNS cache server.

[Flowchart Diagram of Third Embodiment]

Figure 25:
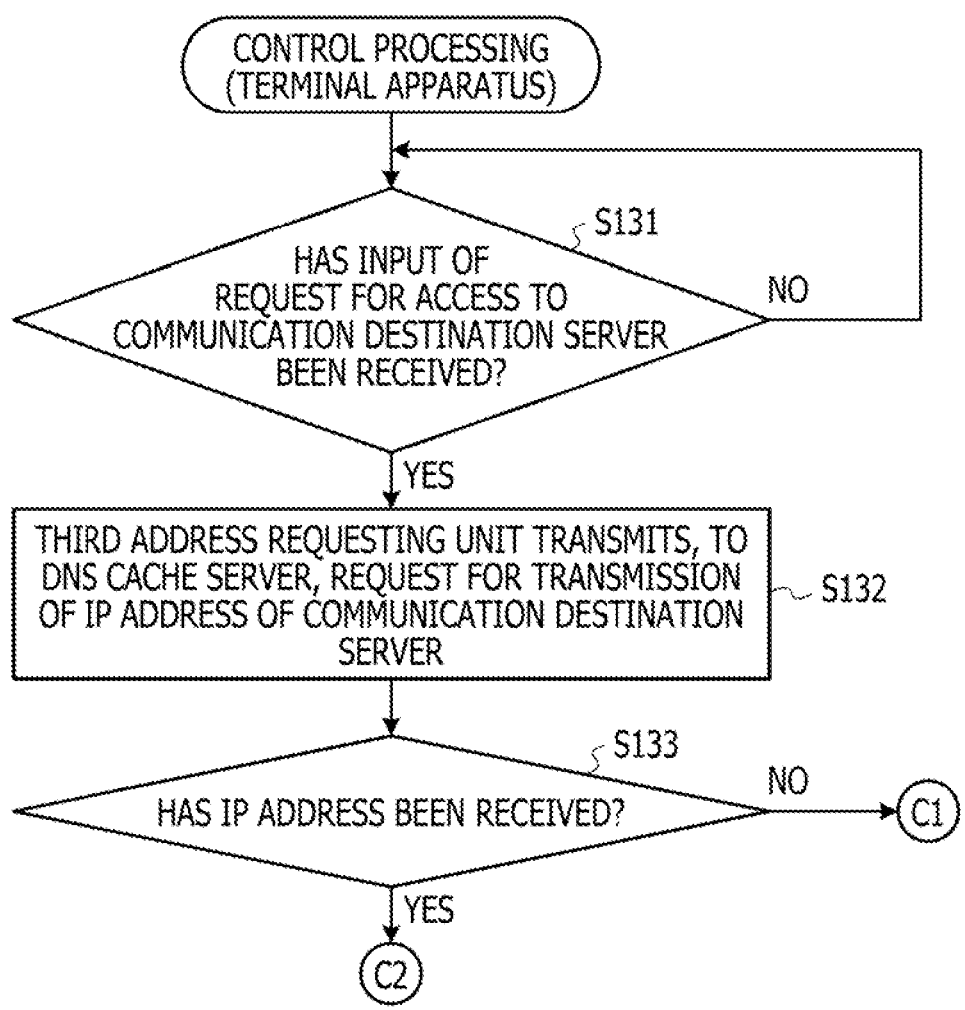
FIG. 25 is a flowchart diagram for explaining control processing in the third embodiment.
Figure 27:
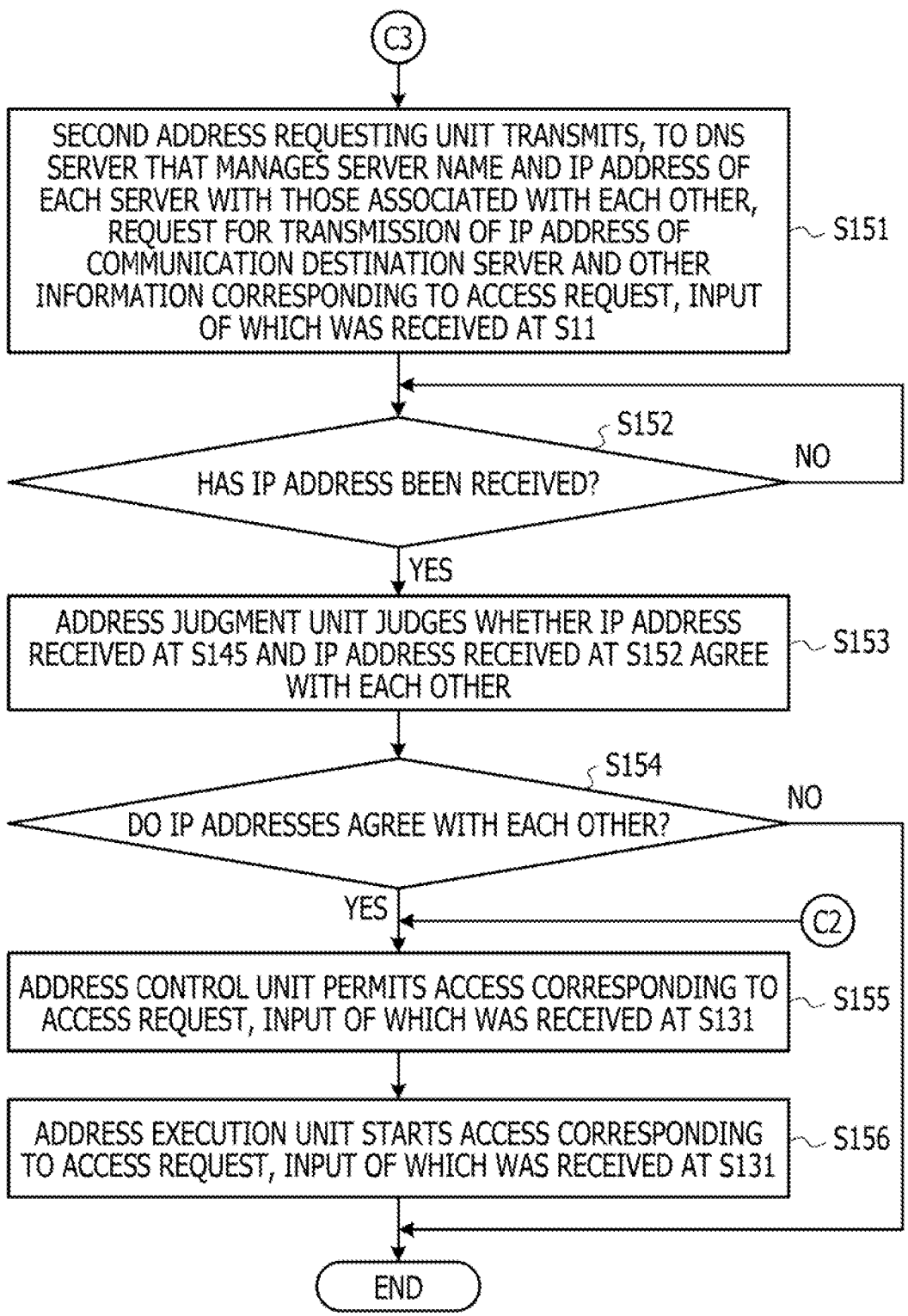
FIG. 27 is a flowchart diagram for explaining the control processing in the third embodiment.

Next, flowchart diagrams of the third embodiment are described. FIGS. 25 and 27 are flowchart diagrams for explaining control processing in the third embodiment. Note that in the control processing in the third embodiment, the processing in the CT log server 4, the processing in the certificate authority server 1, the processing in the communication destination server 2, and the processing in the DNS server 5 are the same as that in the control processing in the first and second embodiments, and hence, description thereof is omitted.

[Control Processing in Terminal Apparatus]

As illustrated in FIG. 25, the input reception unit 311 waits until the input reception unit 311 receives an input of a request for access to the communication destination server 2 (NO at S131).

When the input reception unit 311 receives an input of a request for access to the communication destination server 2 (YES at S131), the third address requesting unit 319 of the terminal apparatus 3 transmits a request for transmission of the IP address of the communication destination server 2 to the DNS cache server (S132).

After that, the third address requesting unit 319 waits until the third address requesting unit 319 receives the IP address of the communication destination server 2 transmitted from the DNS cache server (S133).

When the third address requesting unit 319 receives the IP address of the communication destination server 2 transmitted from the DNS cache server (YES at S133), the access control unit 318 permits access corresponding to the access request the input of which was received in the process at S131, as illustrated in FIG. 27 (S155).

After that, the access execution unit 317 starts access corresponding to the access request the input of which was received in the process at S131 (S156).

In the case where the IP address of the communication destination server 2 is not transmitted from the DNS cache server, or in the case where the terminal apparatus 3 receives, from the DNS cache server, information indicating that the IP address of the communication destination server 2 is not stored in the DNS cache server (NO at S133), the terminal apparatus 3 performs the processing in S141 and after.

For example, in the case where an inquiry for the IP address of the communication destination server 2 was made to the DNS server 5 before and where the IP address is stored in the DNS cache server, the terminal apparatus 3 judges that the IP address transmitted from the DNS cache server is valid and permits access to the IP address.

This enables the terminal apparatus 3 to reduce processing loads on the CT log server 4 and the certificate authority server 1 associated with the execution of the control processing.

Note that even in the case where the IP address of the communication destination server 2 was transmitted from the DNS cache server in the process at S133, if the date and time when the IP address was stored in the DNS cache server is before a specified date and time, the terminal apparatus 3 may judge that there is a possibility that the IP address transmitted from the DNS cache server is not valid and may perform the processing in S141 and after.

Figure 26:
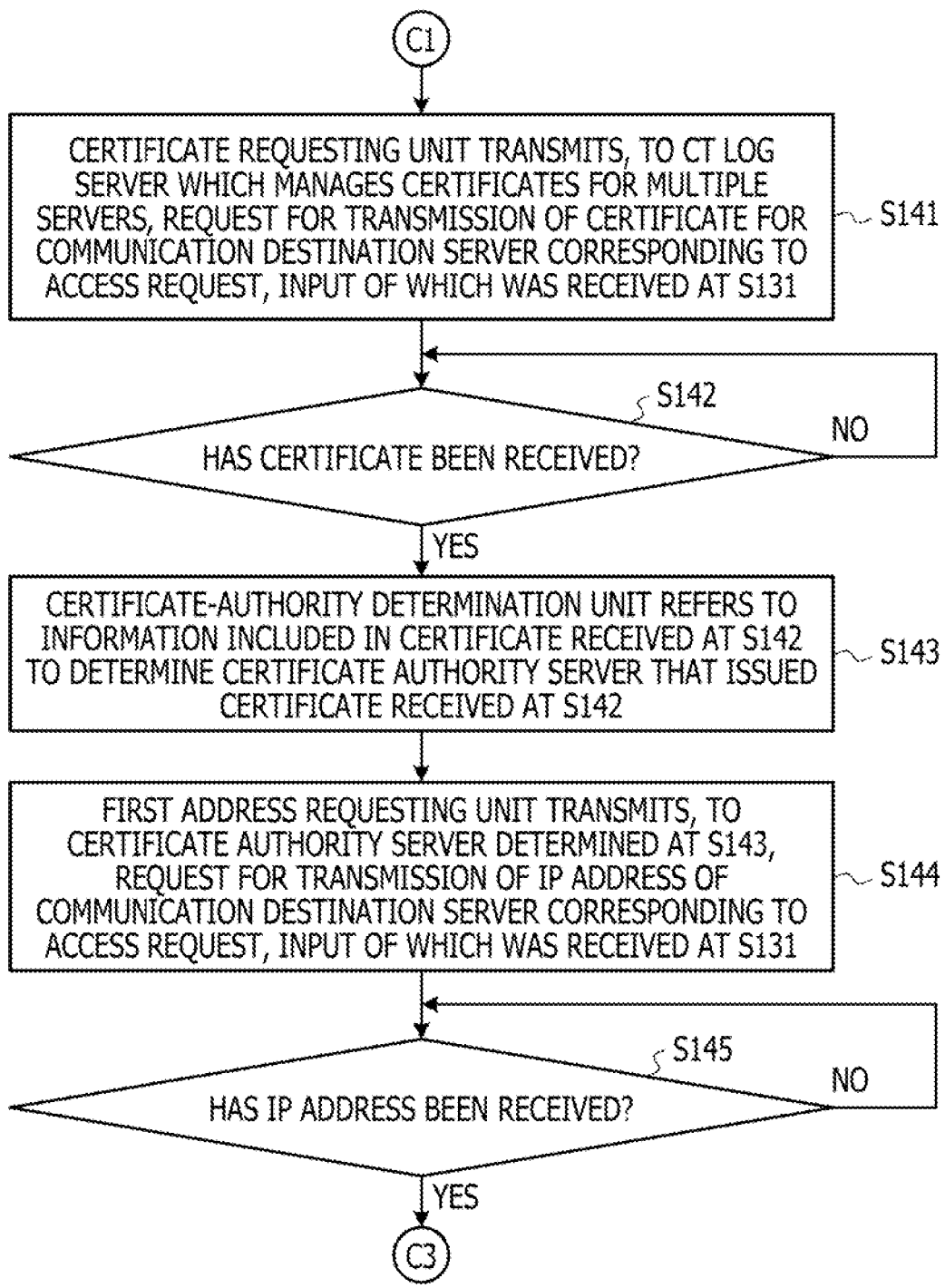
FIG. 26 is a flowchart diagram for explaining the control processing in the third embodiment.

Returning to FIG. 25, in the case where the IP address of the communication destination server 2 is not transmitted from the DNS cache server, or in the case where the terminal apparatus 3 receives, from the DNS cache server, information indicating that the IP address of the communication destination server 2 is not stored in the (NO at S133), the certificate requesting unit 312 transmits a request for transmission of the certificate CE for the communication destination server 2 corresponding to the access request the input of which was received in the process at S131, to the CT log server 4 which manages certificates CE for multiple servers, as illustrated in FIG. 26 (S141).

After that, the certificate requesting unit 312 waits until the certificate requesting unit 312 receives the certificate CE for the communication destination server 2 from the CT log server 4 (NO at S142).

When the certificate requesting unit 312 receives the certificate CE for the communication destination server 2 from the CT log server 4 (YES at S142), the certificate-authority determination unit 313 refers to information included in the certificate CE received in the process at S142 to determine the certificate authority server 1 that issued the certificate CE received in the process at S142 (S143).

The first address requesting unit 314 transmits, to the certificate authority server 1 determined in the process at S143, the IP address of the communication destination server 2 corresponding to the access request the input of which was received in the process at S131 and also part of the information included in the certificate CE received in the process at S142 (for example, the FQDN of the communication destination server 2) (S144).

After that, the first address requesting unit 314 waits until the first address requesting unit 314 receives the IP address of the communication destination server 2 from the certificate authority server 1 (NO at S145).

When the first address requesting unit 314 receives the IP address of the communication destination server 2 from the certificate authority server 1 (YES at S145), the second address requesting unit 315, as illustrated in FIG. 27, transmits, to the DNS server 5 which manages the identification information pieces and the IP addresses of servers with those associated with each other, a request for transmission of the IP address of the communication destination server 2 corresponding to the access request the input of which was received in the process at S131 and also the identification information on the communication destination server 2 (for example, the FQDN) (S151).

After that, the second address requesting unit 315 waits until the second address requesting unit 315 receives the IP address of the communication destination server 2 from the DNS server 5 (NO at S152).

When the second address requesting unit 315 receives the IP address of the communication destination server 2 from the DNS server 5 (YES at S152), the address judgment unit 316 judges whether the IP address received in the process at S145 and the IP address received in the process at S152 agree with each other (S153).

In the case where it is judged that the IP addresses agree with each other (YES at S154), the access control unit 318 permits access corresponding to the access request the input of which was received in the process at S131 (S155).

After that, the access execution unit 317 starts access corresponding to the access request the input of which was received in the process at S131 (S156).

This enables the terminal apparatus 3 to reduce processing loads on the Cr log server 4 and the certificate authority server 1 associated with the execution of the control processing, and also t perform control such that the operator's personal information or the like will not be inputted to a fake DNS server or the like.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A control method implemented by a computer which is configured to be operated as a terminal apparatus, the control method comprising:
   transmitting, from the terminal apparatus to a first management server, a first request for transmission of a certificate of a first server, the first server being one of a plurality of servers, the first management server being configured to manage certificates for the plurality of servers;
   in response to the transmitting of the first request, receiving the certificate of the first server from the first management server;
   in response to the receiving of the certificate, determining a certificate authority by using information included in the received certificate, the certificate authority being a server from which the received certificate has been issued;
   transmitting, from the terminal apparatus to the determined certificate authority, a second request for transmission of first address information on the first server;
   transmitting a third request for transmission of second address information on the first server, from the terminal apparatus to a second management server, the second management server being configured to manage the second address information on the first server and corresponding identification information on the first server;
   in response to the transmitting of the third request, receiving the second address information on the first server transmitted from the second management server;
   in response to the transmitting of the second request, receiving the first address information from the determined certificate authority;
   in response to the first address information and the second address information, obtaining a determination result by determining whether the first address information on the first server transmitted from the determined certification authority and the second address information on the first server transmitted from the second management server agree with each other; and
   in response to the determination result indicating that the first address information and the second address information do not agree with each other, limiting access to the first server.

2. The control method according to claim 1, wherein the information included in the certificate is address information on the certificate authority that has issued the certificate.

3. The control method according to claim 1, wherein the transmitting of the first request causes the certificate authority to execute processing including:
   transmit the first request for transmission of the first address information on the first server from the certificate authority to the first server;
   in response to the transmitting of the first request, receiving at the certificate authority, the first address information on the first server; and
   in response to the receiving of the first address information, transmitting from the certificate authority to the terminal apparatus, the received first address information on the first server.

4. The control method according to claim 1, further comprising:

in response to the determination result indicating that the first address information and the second address information agree with each other, permitting access to the first server.

5. The control method according to claim 4, wherein
the transmitting of the second request and the transmitting of the third request are performed in case where the terminal apparatus detects an access request for accessing to the first server,
the control method further comprises: in response to the detecting of the access request, prohibiting access corresponding to the access request,
the limiting of the access is configured to continue to prohibit access corresponding to the access request, and
the permitting of the access is configured to permit access corresponding to the access request.

6. The control method according to claim 4, wherein
the transmitting of the second request and the transmitting of the third request is performed when the terminal apparatus detects an access request for accessing to the first server,
the control method further comprises: in response to the detecting of the access request, permitting access corresponding to the access request, but prohibiting input of information associated with the access corresponding to the access request to the first server,
the limiting of the access is configured to continue to prohibit input of information associated with the access corresponding to the access request to the first server, and
the permitting of the access is configured to permit input of information associated with the access corresponding to the access request to the first server.

7. The control method according to claim 4, further comprising
transmitting a fourth request for transmission of third address information on the first server, from the terminal apparatus to a third management server, the third management server being configured to manage the third address information that has been transmitted from the second management server before, wherein
the transmitting of the first request and the transmitting of the third request are performed in a case where the terminal apparatus does not receive the third address information on the first server from the third management server during a predetermined time period after the transmitting of the fourth request.

8. An information processing apparatus operable as a terminal apparatus, the information processing apparatus comprising:
a memory; and
a processor coupled to the memory, the processor being configured to execute program instructions, the program instructions including:
transmitting, from the information processing apparatus to a first management server, a first request for transmission of a certificate of a first server, the first server being one of a plurality of servers, the first management server being configured to manage certificates for the plurality of servers;
in response to the transmitting of the first request, receiving the certificate of the first server from the first management server;
in response to the receiving of the certificate, determining a certificate authority by using information included in the received certificate, the certificate authority being a server from which the received certificate has been issued;
transmitting, from the information processing apparatus to the determined certificate authority, a second request for transmission of first address information on the first server;
transmitting a third request for transmission of second address information on the first server, from the terminal apparatus to a second management server, the second management server being configured to manage the second address information on the first server and corresponding identification information on the first server;
in response to the transmitting of the third request, receiving the second address information on the first server transmitted from the second management server;
in response to the transmitting of the second request, receiving the first address information from the determined certificate authority;
in response to the first address information and the second address information, obtaining a determination result by determining whether the first address information on the first server transmitted from the determined certification authority and the second address information on the first server transmitted from the second management server agree with each other; and
in response to the determination result indicating that the first address information and the second address information do not agree with each other, limiting access to the first server.

9. A non-transitory computer-readable storage medium for storing a control program which causes a processor to perform processing, the processing comprising:
transmitting, from the information processing apparatus to a first management server, a first request for transmission of a certificate of a first server, the first server being one of a plurality of servers, the first management server being configured to manage certificates for the plurality of servers;
in response to the transmitting of the first request, receiving the certificate of the first server from the first management server;
in response to the receiving of the certificate, determining a certificate authority by using information included in the received certificate, the certificate authority being a server from which the received certificate has been issued;
transmitting, from the information processing apparatus to the determined certificate authority, a second request for transmission of first address information on the first server;
transmitting a third request for transmission of second address information on the first server, from the terminal apparatus to a second management server, the second management server being configured to manage the second address information on the first server and corresponding identification information on the first server;
in response to the transmitting of the third request, receiving the second address information on the first server transmitted from the second management server;
in response to the transmitting of the second request, receiving the first address information from the determined certificate authority;
in response to the first address information and the second address information, obtaining a determination result by determining whether the first address information on the first server transmitted from the determined certification authority and the second address information on the first server transmitted from the second management server agree with each other; and in response to the determination result indicating that the first address information and the second address information do not agree with each other, limiting access to the first server.

* * * * *